United States Patent [19]

Rubner

[11] 4,250,483

[45] Feb. 10, 1981

[54] SYSTEM FOR SIGNALIZED INTERSECTION CONTROL

[76] Inventor: Anthony C. Rubner, 6374 Iris Ct., Arvada, Colo. 80004

[21] Appl. No.: 873,697

[22] Filed: Jan. 30, 1978

Related U.S. Application Data

[63] Continuation-in-part of Ser. No. 687,336, May 5, 1976, abandoned.

[51] Int. Cl.[3] .......................... G08G 1/07; G06F 15/48

[52] U.S. Cl. .......................... 340/40; 340/41 R; 364/436; 364/900

[58] Field of Search .................... 340/40, 41 R, 37, 36; 364/200, 900, 436, 437, 438

[56] References Cited

U.S. PATENT DOCUMENTS

| | | | |
|---|---|---|---|
| 3,594,719 | 7/1971 | Endo et al. | 340/40 |
| 3,920,967 | 11/1975 | Martin et al. | 340/40 |

*Primary Examiner*—John W. Caldwell, Sr.
*Assistant Examiner*—James J. Groody

[57] ABSTRACT

A coordinated traffic signal control system comprising a plurality of signalized intersections with controllers including coordination means to relate cycle timing between intersections without dedicated interconnecting communication channels. Coordination means including radio receiver tuned to receive broadcast standard time such as from National Bureau of Standards Station WWV, cycle timers related to data from broadcast time after iterative broadcast data check, signal cycle program selection from a plurality of programmable signal cycle program data inputs with cycle length and offset selection through time of day or traffic count program outputs, such a system providing fixed cycle timing relationship with other similarly equipped intersections that responds to anticipated or detected changes in traffic patterns.

16 Claims, 20 Drawing Figures

FIG. 1
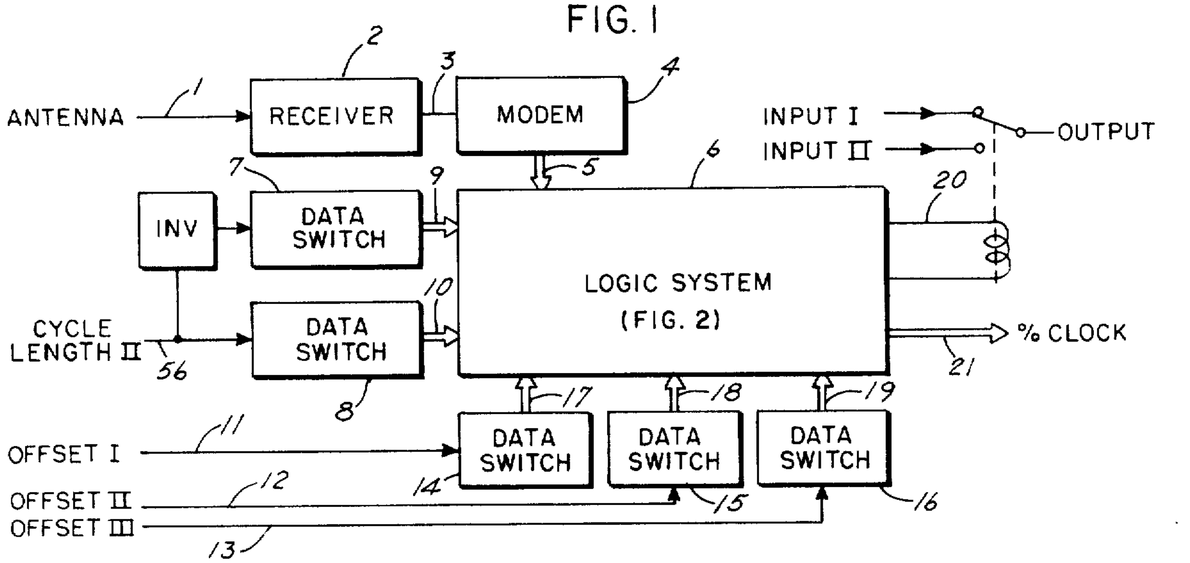
FIG. 2
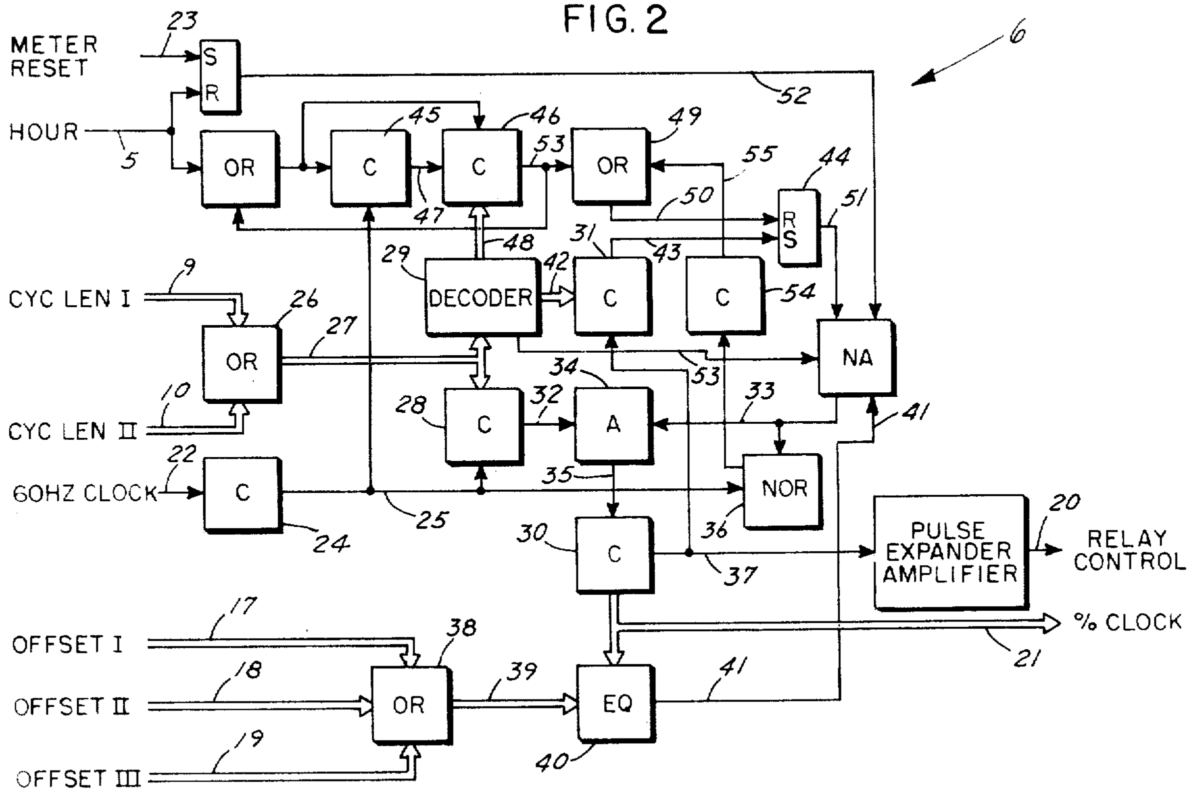
FIG. 3
| CYCLE LENGTH | CYCLES PER HOUR | LEAST COMMON MULTIPLE | MINUTE COUNTER | CYCLE COUNTER |
|---|---|---|---|---|
| 10 | 360 | 60 | 1 | 6 |
| 20 | 180 | 60 | 1 | 3 |
| 30 | 120 | 60 | 1 | 2 |
| 40 | 90 | 120 | 2 | 3 |
| 50 | 72 | 300 | 5 | 6 |
| 60 | 60 | 60 | 1 | 1 |
| 80 | 45 | 240 | 4 | 3 |
| 90 | 40 | 180 | 3 | 2 |
| 100 | 36 | 300 | 5 | 3 |
| 120 | 30 | 120 | 2 | 1 |
| 150 | 22 | 300 | 5 | 2 |

PRIMARY INTERVAL PROGRAM

| XY % OF CYCLE | X0 | X1 | X2 | X3 | X4 | X5 | X6 | X7 | X8 | X9 |
|---|---|---|---|---|---|---|---|---|---|---|
| 0Y | 6 | 6 | 6 | 6 | 6 | 6 | 6 | 6 | 6 | 6 |
| 1Y | 6 | 6 | 6 | 6 | 6 | 6 | 6 | 6 | 6 | 6 |
| 2Y | 7 | 7 | 7 | 7 | 7 | 7 | 7 | 7 | 7 | 7 |
| 3Y | 7 | 7 | 7 | 8 | 8 | 8 | 8 | 8 | 9 | 9 |
| 4Y | A | A | A | A | A | A | A | A | A | A |
| 5Y | B | B | B | C | C | D | D | D | D | D |
| 6Y | D | D | D | D | D | D | D | D | D | D |
| 7Y | D | D | D | D | D | D | D | D | D | D |
| 8Y | 0 | 0 | 0 | 0 | 0 | 0 | 0 | 0 | 0 | 0 |
| 9Y | 0 | 0 | 0 | 1 | 1 | 1 | 1 | 1 | 2 | 2 |

INTERVALS

ALTERNATE INTERVAL PROGRAM (FOR SIDE STREET TURN CALLS)

| XY % OF CYCLE | Y0 | X1 | X2 | X3 | X4 | X5 | X6 | X7 | X8 | X9 |
|---|---|---|---|---|---|---|---|---|---|---|
| 0Y | 3 | 3 | 3 | 3 | 3 | 3 | 3 | 3 | 3 | 3 |
| 1Y | 4 | 4 | 4 | 5 | 5 | 6 | 6 | 6 | 6 | 6 |
| 2Y | 6 | 6 | 6 | 6 | 6 | 6 | 6 | 6 | 6 | 6 |
| 3Y | 7 | 7 | 7 | 7 | 7 | 7 | 7 | 7 | 7 | 7 |
| 4Y | 7 | 7 | 7 | 8 | 8 | 8 | 8 | 8 | 9 | 9 |
| 3Y | A | A | A | A | A | A | A | B | B | B |
| 4Y | C | C | D | D | D | D | D | D | D | D |
| 7Y | D | D | D | D | D | D | D | D | D | D |
| 8Y | 0 | 0 | 0 | 0 | 0 | 0 | 0 | 0 | 0 | 0 |
| 9Y | 0 | 0 | 0 | 1 | 1 | 1 | 1 | 1 | 2 | 2 |

512×4 PROM

PRIMARY SIGNAL PROGRAM

ALTERNATE SIGNAL PROGRAM (FOR MAIN STREET TURN CALLS)

PRIMARY INTERVAL PROGRAM

| XY % OF CYCLE | X0 | X1 | X2 | X3 | X4 | X5 | X6 | X7 | X8 | X9 |
|---|---|---|---|---|---|---|---|---|---|---|
| 0Y | 7 | 7 | 7 | 7 | 7 | 7 | 7 | 7 | 7 | 7 |
| 1Y | 6 | 6 | 6 | 6 | 6 | 2 | 2 | 2 | 2 | 2 |
| 2Y | 2 | 2 | 2 | 2 | 2 | 2 | 2 | 2 | 2 | 2 |
| 3Y | 2 | 2 | 2 | 2 | 2 | 2 | 2 | 2 | 2 | 2 |
| 4Y | 2 | 2 | 2 | 2 | 2 | 2 | 2 | 2 | 2 | 2 |
| 5Y | 5 | 5 | 5 | 5 | 5 | 5 | 5 | 5 | 5 | 5 |
| 6Y | 4 | 4 | 4 | 4 | 4 | 0 | 0 | 0 | 0 | 0 |
| 7Y | 0 | 0 | 0 | 0 | 0 | 0 | 0 | 0 | 0 | 0 |
| 8Y | 0 | 0 | 0 | 0 | 0 | 0 | 0 | 0 | 0 | 0 |
| 9Y | 0 | 0 | 0 | 0 | 0 | 0 | 0 | 0 | 0 | 0 |

ALTERNATE INTERVAL PROGRAM

| XY % OF CYCLE | X0 | X1 | X2 | X3 | X4 | X5 | X6 | X7 | X8 | X9 |
|---|---|---|---|---|---|---|---|---|---|---|
| 0Y | 7 | 7 | 7 | 7 | 7 | 7 | 7 | 7 | 7 | 7 |
| 1Y | 3 | 3 | 3 | 3 | 3 | 2 | 2 | 2 | 2 | 2 |
| 2Y | 2 | 2 | 2 | 2 | 2 | 2 | 2 | 2 | 2 | 2 |
| 3Y | 2 | 2 | 2 | 2 | 2 | 2 | 2 | 2 | 2 | 2 |
| 4Y | 2 | 2 | 2 | 2 | 2 | 2 | 2 | 2 | 2 | 2 |
| 5Y | 5 | 5 | 5 | 5 | 5 | 5 | 5 | 5 | 5 | 5 |
| 6Y | 1 | 1 | 1 | 1 | 1 | 0 | 0 | 0 | 0 | 0 |
| 7Y | 0 | 0 | 0 | 0 | 0 | 0 | 0 | 0 | 0 | 0 |
| 8Y | 0 | 0 | 0 | 0 | 0 | 0 | 0 | 0 | 0 | 0 |
| 9Y | 0 | 0 | 0 | 0 | 0 | 0 | 0 | 0 | 0 | 0 |

SYSTEM FOR SIGNALIZED INTERSECTION CONTROL

This application is a continuation-in-part of Ser. No. 687,336, May 5, 1976, now abandoned.

DESCRIPTION OF THE PRIOR ART

Progressive traffic signal control systems, which provide for the staggered operation of the successive signals along an artery, permitting a vehicle traveling along such artery in a predetermined direction and with a predetermined velocity to encounter all green signals, are well known in the art. In such systems, it is common to demarcate a signal cycle of predetermined duration which is common for all the signals along the artery, and in some systems the duration of the common signal cycle is made variable in accordance with the traffic conditions or in accordance with a time program.

In such prior art progressive signal systems, the start of the signal cycle at any intersection is delayed by a predetermined amount from the starting time of the signal cycle for the last encountered signal, and this may be done to all the signals in turn for a progression which favors a particular direction of traffic. If signals are evenly spaced, a cycle length can be selected to provide two-way progression. The amount of phase shift of the signal cycle from a first encountered signal to a second encountered signal along the artery for a given direction of traffic is a function of the distance between such signal locations. By graphic, empiric or numeric techniques, it is possible to adjust each controller to provide a desired offset so that a favored direction of traffic, moving at an assumed velocity, will ordinarily be permitted to move smoothly through the system.

The offset which should be in effect, at any particular intersection and at any given time, is a function of traffic conditions, being dependent upon which direction of traffic has the predominant flow, the extent of the difference in flow, and the average speed of travel of the traffic. Normally three offsets are adequate to reduce delays; one favoring inbound traffic, another for outbound traffic, and a third for the average offsets that favor both directions, but with a reduced progressive capacity. Frequently a few signals along an artery can be selected for offset changes to improve directional progressive capacity. Often these few intersections are minor intersections which fall outside of the evenly spaced signals along the artery.

Electronic control systems play an increasing role in eliminating simple and boring tasks in modern industry. Such systems are frequently designed with circuitry using two states of logic, such systems are called digital logic systems. These digital logic systems are built using solid state technology without vacuum tubes or relays. Solid state components are commonly of the integrated circuit type rather than of the discrete circuit type. Metal-oxide semiconductor, or other low power consumption device technology is frequently used in constructing these circuits. Combination of discrete and integrated circuits are used, such combinations being known as hybrid integrated circuits. In any case, the components are usually grouped together in modules. These modules take the form of printed circuit boards to which are attached the integrated circuits, the hybrid integrated circuits or the discrete components. The printed circuit board provides for interconnection within the circuits attached to it, and provides termination for circuit connections that must be made to the module. The printed circuit modules are placed in the frame of an assembly and interfaced to each other, to other systems and to system operators, to accomplish the tasks for which the assembly was designed.

Hybrid integrated circuit technology has been combined with computer technology to generate families of microcomputer systems. The design and marketing of microcomputer systems is so active and prices low enough that digital systems can be economically implemented using microcomputers that are run with real time reference. It is now practical to implement some systems with several modules, each module containing real time computers that perform as discrete logic systems.

Microcomputer systems provide processor, memory and input/output to execute a program of processor instructions, and control input and output to accomplish a task. Microcomputer systems normally provide intrasystem communications on a control bus, an address bus and a data bus; a bus consisting of a plurality of processor circuits which are functionally related. The address bus signals contain the register location of the next word of program instruction to be executed, or the next word of data to be processed. The data contents of the register that is selected on the address bus is automatically asserted on the data bus by a device controlling memory. The control bus provides timing reference and control information used in the transfer of data from one component of the microcomputer to another. By sequencing through a program of instructions, contained in memory, the microcomputer system can be made to perform complex functions.

The memory of a computer system can take several forms including magnetic core, magnetic tape, magnetic disk, magnetic drum, random access memory, read only memory, and many other forms. All memory is characterized by the ability to store digital data that can be programed by the processor or by external means.

Programable read only memory (PROM) is a form of memory that is available for user assertion of permanent data. PROM matrixes have been constructed as hybrid integrated circuits so that selected diode cells within the matrix can burnt out by a current surge that is applied to the cell by the end user to mark data within the matrix. These diode cells are arranged in registers and selected by decoding the information on the address bus such that the data on the register is buffered and asserted on the data bus for use by the processor.

It is often desirable to market a number of models of a system, with each model providing the options required of a specific application. All models that are desirable are frequently not provided because of the costs of large inventory, or added costs of custom manufacture. The use of microcomputers in systems, allows the designer to provide many options in a system with little additional costs, but requires a means to schedule these options prior to final delivery.

Real time on line digital computer systems frequently require a lot of input data to change the program and control the outputs. Such inputs might be in the form of system options installed at the time of manufacture, options and parameters for system operator use, or options for automatic input from external subsystems or systems. Most of these inputs do not require continuous monotoring by the processor but can be scheduled for periodic review during the process of the system program.

Microcomputer systems have a variety of input/output facilities. In many systems, input/output is provided through hybrid integrated circuits which can be addressed and controlled to provide input or output by the processor. These circuits are frequently provided with the capability to interupt the processor, save the program being run, branch the program control to an input/output program, and service the input or output before returning to the interrupted program. In real time systems it may be desirable to scan inputs at a periodic interval with a scan rate that will allow no real inputs to be lost. Interupt is not required to service new data with such a scan program.

It is frequently desirable to interface a high level voltage input to the low level logic of the digital computer or other digital device. For example, an AC line voltage may need to be interfaced. Opto-isolators are frequently used for their high speed and high degree of signal isolation in this type of interface. These opto-isolators utilize a light emitting diode with current limiting and rectification in the primary circuit as required, light sensitive diodes in the secondary circuit, and light conduction between primary diode and secondary diode.

Traffic signal controllers are provided to generate altering assignment of vehicular and pedestrian signal displays for a plurality of traffic phases by sequencing through pretimed or traffic responsive timed intervals and providing proper display to indicate right-of-way assignments.

The industry of controller manufacturers have joined with user groups to generate the National Electrical Manufacturers Association (NEMA) Standards for Traffic Control Systems (TS 1-1976). NEMA Standards provide specifications regarding definitions, performance and interfacing to assure that controllers manufactured to the standards are interchangable.

Under NEMA Standards traffic signal controller units have been manufactured to provide logic required to drive load switches in a controller assembly. Controller units provide control through discrete and integrated logic circuits packaged in modules and assembled as a unit, or through computer technology with logic centralized in a processor and the instruction set of the computer.

In the art of computer system interface there is a lack of economical input for large quantities of option and parameter information that can be used by the processor periodically under program control to determine which optional programs are to be utilized. Option and parameter information should be arranged in addressible registers with respect to how, or how often, the program uses the data rather than arranged with respect to input/output hardware for optimization of available time and program simplicity. Option and paramiter information should be programable as a function of the type of option or parameter on assembly of the unit, by system operator, or by automatic input from other systems.

New technology in microcomputer manufacturing has provided low cost, low component count computer systems with processor, scratchpad random access memory, clock, power on reset, timer interrupt, mask program memory with custom instruction data, and sufficient input/output capability to provide one or two chip computers that can be designed to perform as custom discrete logic systems.

In the art of traffic signal systems there is a lack of simplified controller units that provide the advantages of modular design and computer technology with simplified inter-module communications that allow the use of a universal master module and identical phase modules for 2 phase, 3 phase, 4 phase and 8 phase controller units.

In the art of centralized coordinated signal systems, traffic data is input to a master over communication channels from street detectors. At the master, cycle length, sync reference, and offset selection functional signals are formatted, then transmitted to the controlled intersection over communication channels. The master may override or supervise the intersection controller unit. When override is used, phase sequencing, interval timing and interval sequencing is determined at the master. When supervision is used, certain green intervals are held or forced off by the master and the intersection controller unit generates phase sequencing, interval timing and interval sequencing.

Prior art systems for controlling traffic signals using time input from WWV, National Bureau of Standards—Frequency and Time Broadcast Services, lack provisions for scheduling and generating syncronization on a plurality of selectable cycle lengths and offsets, and do not provide for time of day or traffic responsive adjustment in the timing plan to accommodate anticipated or detected changes in traffic conditions.

Centralized master systems meet the demand for provisions of scheduling and generating coordination of a plurality of cycle lengths and offsets but require costly interconnect channels for transmission of data. There is need for decentralized master system providing coordination on a plurality of cycle lengths and offsets in response to time of day and traffic responsive programs without the need for telephone, direct wire or dedicated radio channels.

A traffic signal controller providing modular design with simplified inter-module communication with universal master module, identical phase modules, coordination including time of day and traffic responsive adjustment capability, and an economical system for input of large quanities of option and parameter information for computers is the subject of this patent.

BRIEF SUMMARY OF THE INVENTION

This system for signalized intersection control involves a plurality of signalized intersections with controllers comprised of; coordination means to relate timing between intersections, controller unit means to generate phase sequencing, interval timing and interval sequencing, overlap means to provide right-of-way indications that allows traffic movement when right-of-way is being assigned to two or more traffic phases concurrently, preemptor means to transfer phase sequencing to a special program that will clear a railroad crossing, or allow preference to emergency vehicles, load switch means for driving signal displays, and conflict prevention means to transfer signal display to flashing mode on any first failure in the controller that causes display of conflicting right-of-way indications. Controller unit can incorporate one or more of; coordination means, overlap means, conflict prevention means, and preemptor means, as modular features.

Controller unit may be actuated to provide phase sequencing, interval timing and interval sequencing in response to traffic demand, or pretimed to provide phase sequencing, interval timing and interval sequencing according to a time of cycle program.

A master module is a module of the controller unit that provides coordination and phase sequencing by utilizing a simple real time digital computer with an economical system for input of option and paramiter data to the computer under control of a master real time program so that no real input is lost. The coordination means provides synchronization on a plurality of selectable cycle lengths, a plurality of selectable offsets referenced to broadcast standard time, time of day functions, and traffic functions.

A phase module is a module of an actuated controller unit that provides interval sequencing, interval timing and normal vehicular and pedestrian load switch driver outputs in response to traffic demand when selected by a master module, by utilizing a simple real time digital computer with an economical system for input of option and paramiter data to the computer under control of a phase real time program so that no real input is lost.

A preemptor module is a module of the controller unit that provides overlap outputs and preemption special program, utilizing a simple real time digital computer with an economical system for input of option and paramiter data to the computer under control of a preemptor real time program so that no real input is lost.

A pretimed program module is a module of the pretimed controller unit that provides decoding of percent of cycle data to generate vehicular and pedestrian load switch driver outputs from data stored in programable read only memory.

The system for input of option and parameter data includes a matrix of input cells, address decoding and data buffering, to provide data input, under control of a computer that the input system serves, through a minimum of normal computer input/output ports. The matrix of input cells are grouped into registers on an electrical axis and these registers selected by the computer through address decoding. On a second axis of the matrix, input cells are grouped into ports that provide data assertion from the selected register through data buffering. A semiconductor junction in each input cell acts as a diode to connect a register to a port for the input of a mark of data when the register is addressed and addressed register cell is active. Different types of input cells are used for input of data at assembly, by operator, or from automatic external source. This data is used by the computer to schedule an option, or to indicate values for parameters.

An input cell for data entry at assembly includes a diode position within a printed circuit matrix. For data entry by operator an input cell is comprised of a switch in series with a diode within the matrix. An input cell for external data entry includes an opto-isolator with rectification and filtering in the primary, and a light sensitive diode in the secondary to perform as an externally controlled diode within the matrix. Different types of input cells can be installed within the matrix without regard for type of adjacent cell so that the grouping of input cells within the matrix is determined by the use of that input by the computer.

BRIEF DESCRIPTION OF THE DRAWINGS

FIG. 1 indicates a system of logic for an intersection coordination unit, illustrating the relationships between inputs and outputs.

FIG. 2 illustrates an example of the logic that may be used in item 6 of FIG. 1 for the purpose of demonstration.

FIG. 3 shows the relationships between the time of day and various cycle lengths that can be assigned in the system.

There is a continuation of item numbers between FIGS. 1, 2, 4 and 5.

Figure 6:
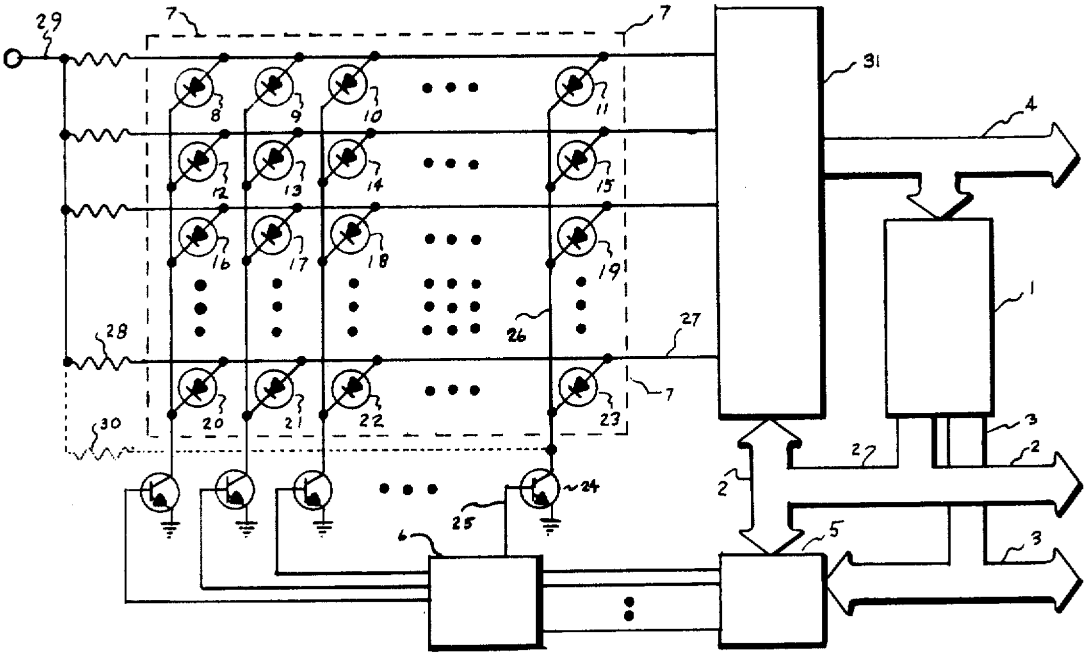

FIG. 6 indicates a system for input of option and parameter data for a digital computer consisting of diode cells in a matrix, matrix control and interface logic. Other figures on the sheet illustrate different diode cells that can be used in the matrix.

Figure 7:
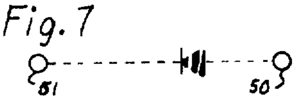

FIG. 7 shows the schematic of a diode cell for input of option or parameter data at the time of circuit assembly, that can be placed as a cell of the matrix 7 in FIG. 6.

Figure 8:
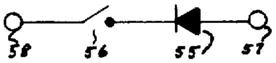

FIG. 8 shows the schematic of a diode cell for operator switch input of option or parameter data that can be placed as a cell of the matrix 7 in FIG. 6.

Figure 9:
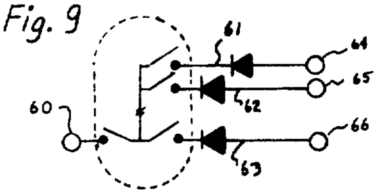

FIG. 9 shows the schematic of a register of diode cells that can be placed as cells of the matrix 7 of FIG. 6, for input of option or paramiter data using a thumbwheel rotating switch.

Figure 10:
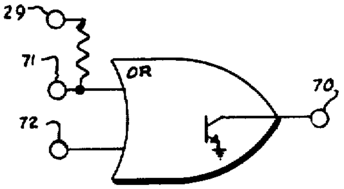

FIG. 10 shows a logic symbol of a diode cell that can be placed as a cell of the matrix 7 of FIG. 6 for input of option and parameter data from a logic system that is operating at logic levels that are compatible with the logic levels of the matrix.

Figure 11:
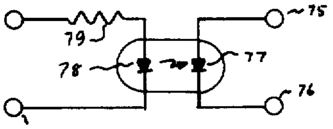

FIG. 11 shows the schematic of a diode cell that can be placed as a cell of the matrix 7 of FIG. 6, for input of option or parameter data from a system that is operating at DC logic levels that are not compatible with the logic levels of the matrix.

Figure 12:
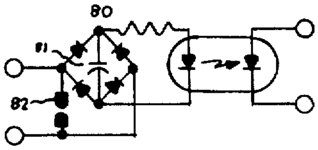

FIG. 12 shows the schematic of a diode cell that can be placed as a cell of the matrix 7 of FIG. 6 for input of option and parameter data from systems operating with AC logic.

There is a continuation of item numbers between FIGS. 8, 9, 10, 11 & 12.

Figure 13:
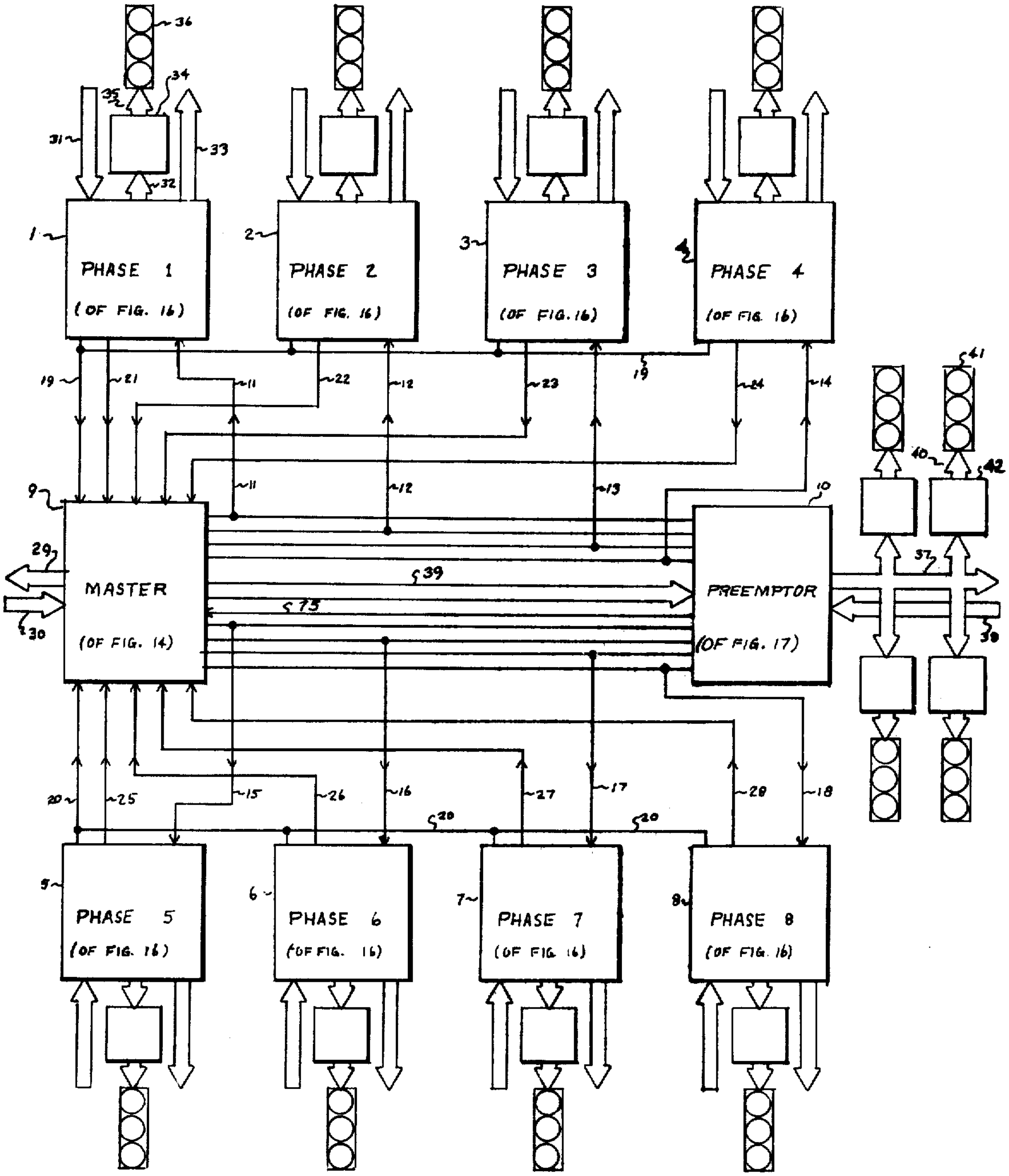

FIG. 13 illustrates an eight phase controller unit system incorporating a means for coordination, overlap means, preemption means and simplified intermodule communication means for phase sequencing, interval timing and sequencing.

Figure 14:
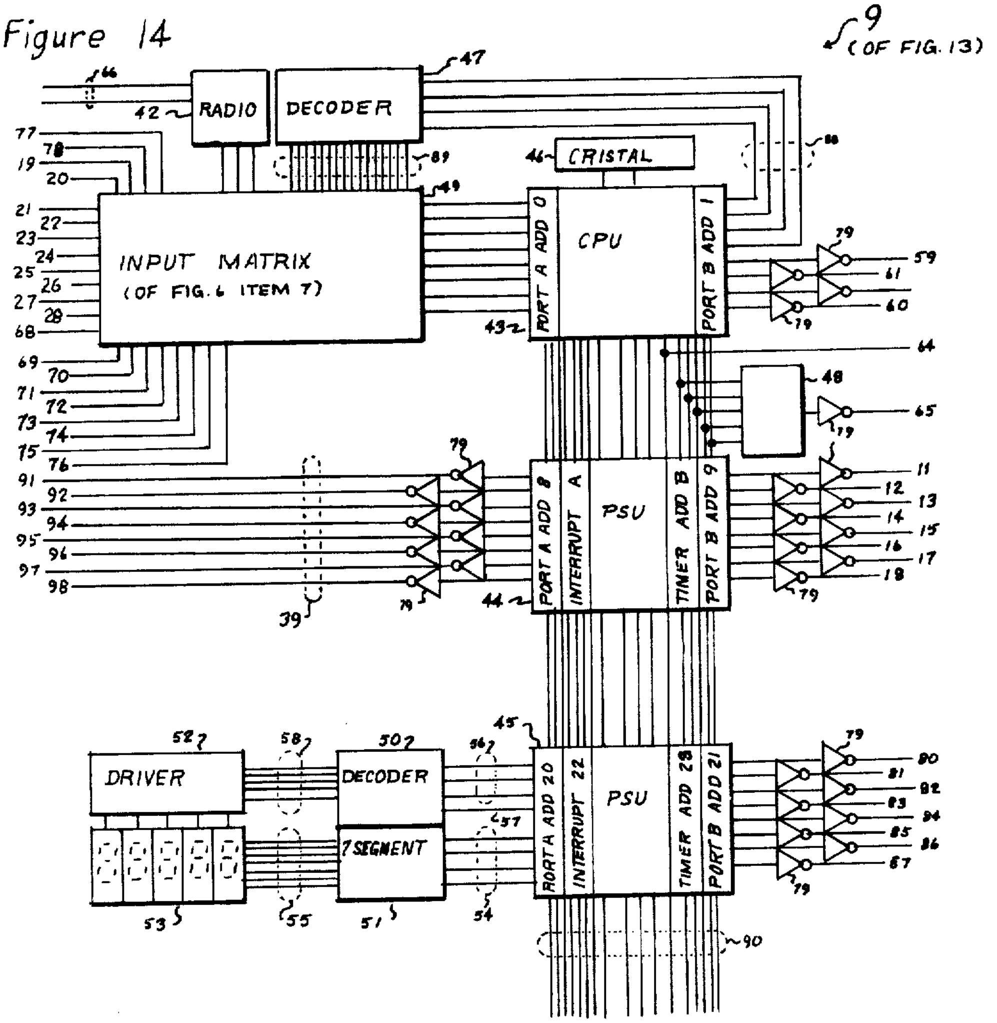

FIG. 14 shows a master module of the controller unit system in FIG. 13 including a means for intersection coordination, system for input of option and paramiter data, simple real time computer that performs as a discrete logic system, and simplified intermodule communications.

Figure 15:
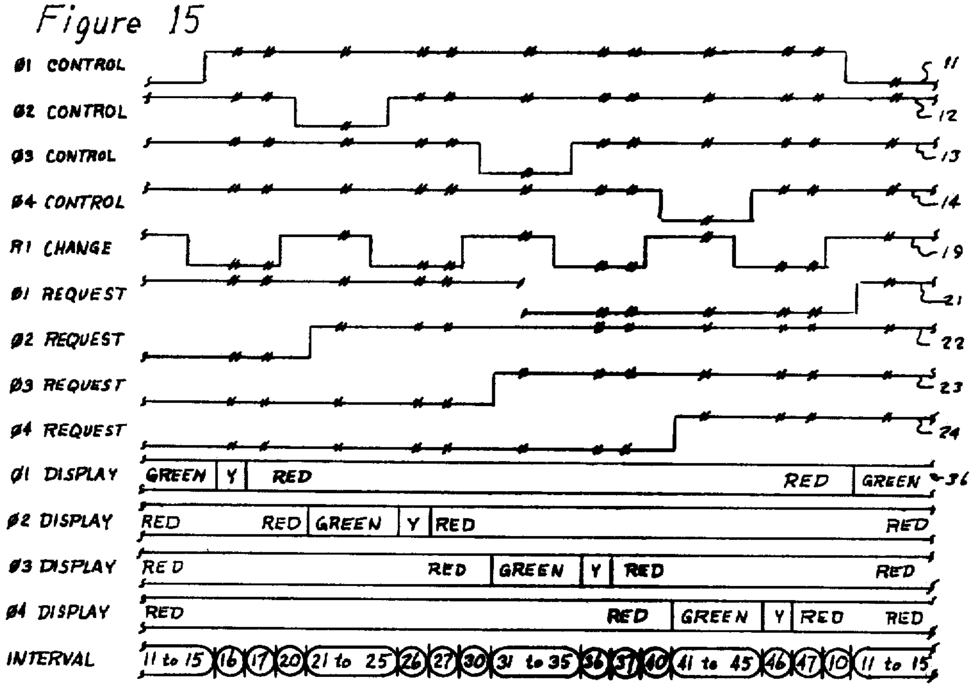

FIG. 15 shows the time relationships of inter-module communications for a ring of controller unit phase and interval sequencing with active state indicated by low level signal. The illustration also indicates signal displays and intervals of the four phases in the ring.

Figure 16:
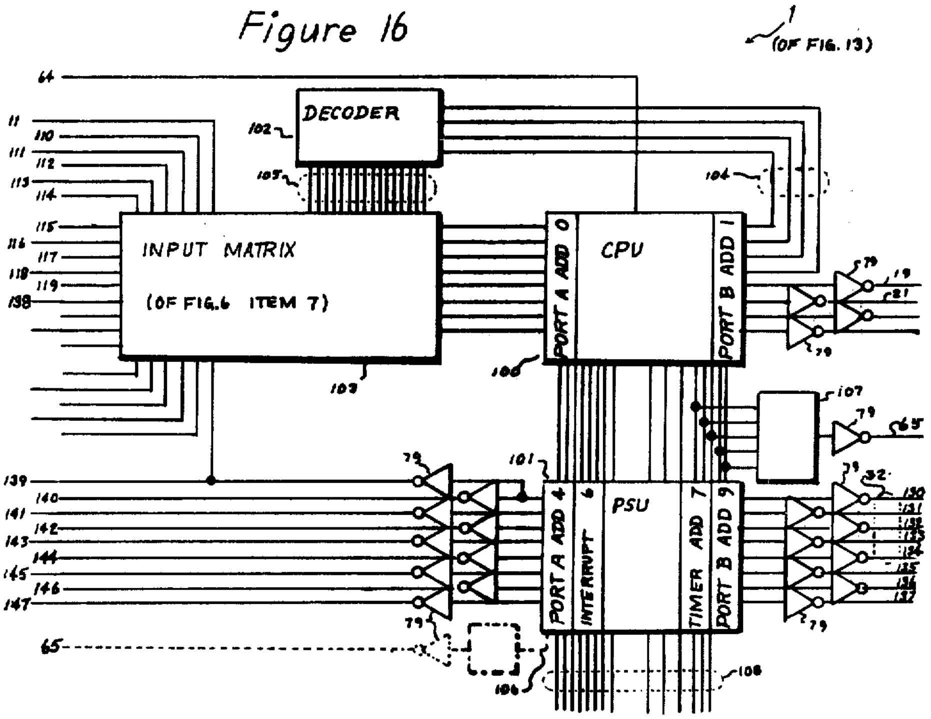

FIG. 16 shows a phase module of the controller unit system in FIG. 13, including a system for input of option and paramiter data, simple real time computer that performs as discrete logic system, and simplified inter-module communications.

Figure 17:
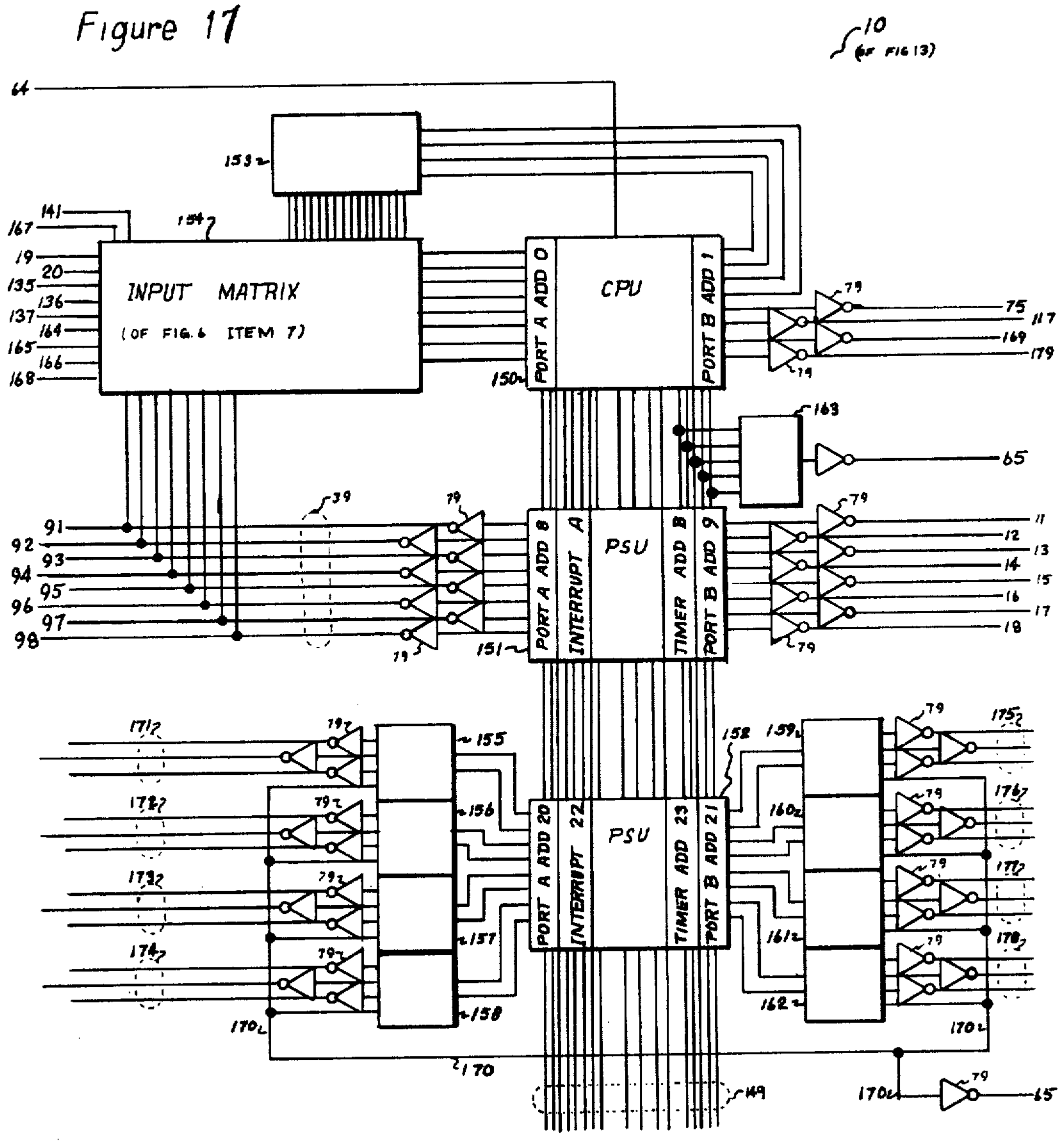

FIG. 17 shows a preemptor module of the controller unit system in FIG. 13 including a means for overlaps, a means for preemption, a system for input of option and paramiter data, simple real time computer that performs as a discrete logic system, and simplified controller inter-module communications.

Figure 18:
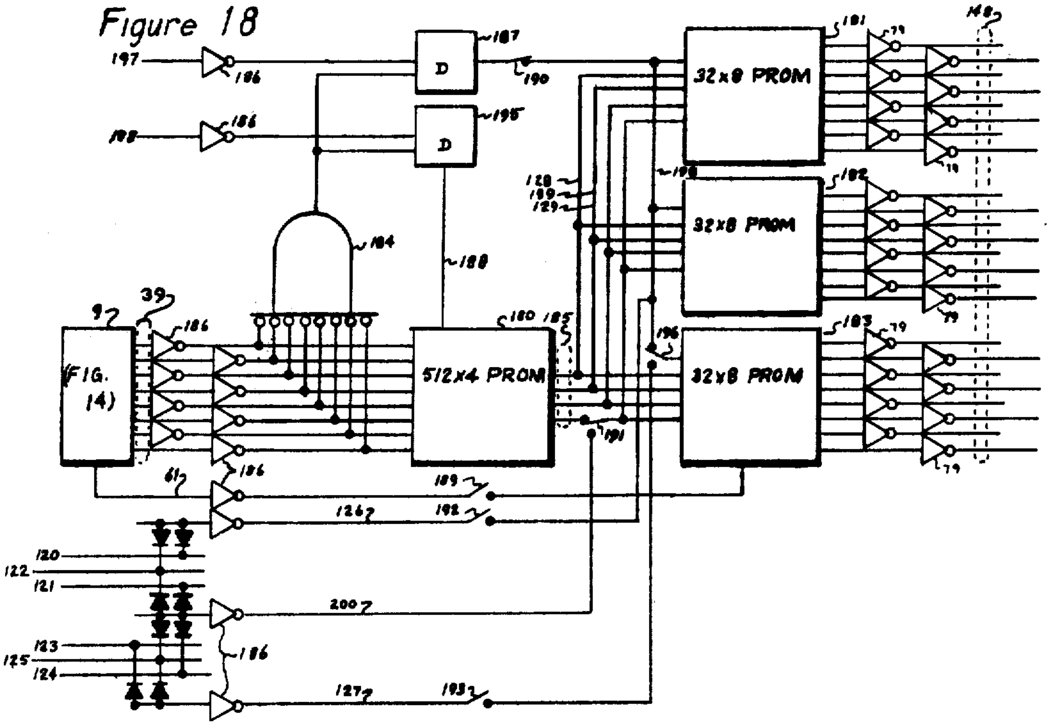

FIG. 18 shows a pretimed controller unit system with the master module of FIG. 14 which generates a percent of cycle output, and pretimed program module for decoding percent of cycle data to generate load switch driver outputs from data stored in programable read only memory.

There is continuation of item numbers thru FIGS. 13, 14, 15, 16, 17 & 18.

Figure 19:
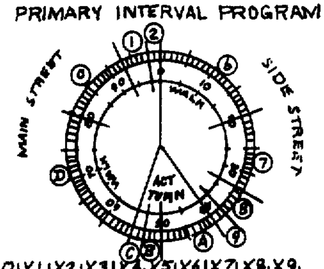
Figure 19:
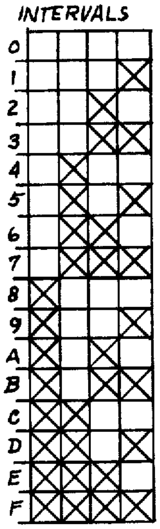
Figure 19:
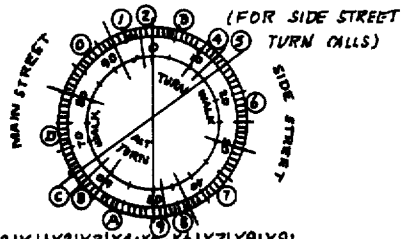
Figure 19:
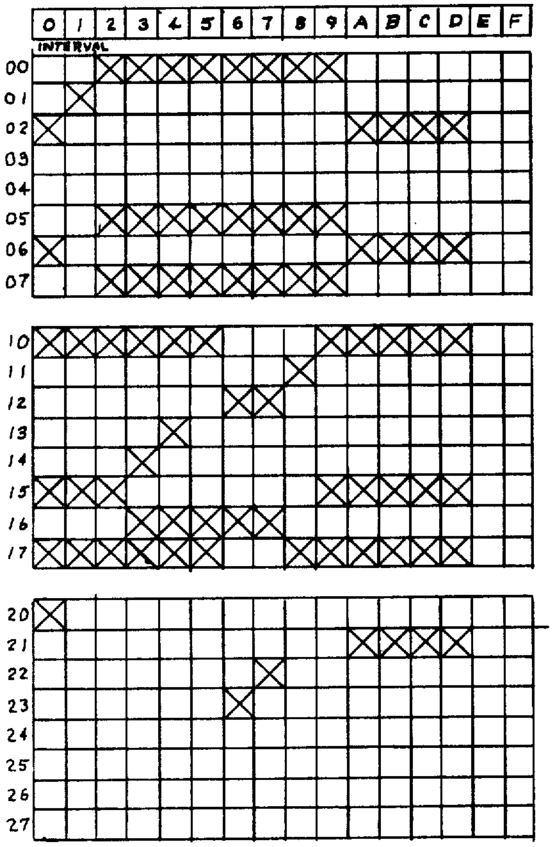
Figure 19:
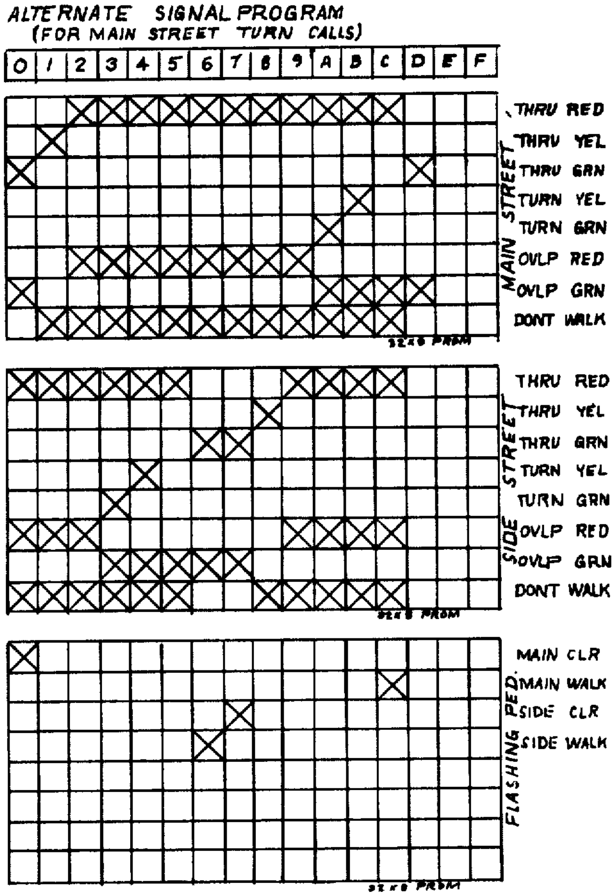

FIG. 19 shows a program for a pretimed controller unit of FIG. 18 to generate a pretimed two phase sequence that can be activated to provide a pretimed three phase sequence on either a side street turn approach or a main street turn approach, or activated to provide a pretimed four phase sequence on both side street turn and main streen turn approaches.

Figure 20:
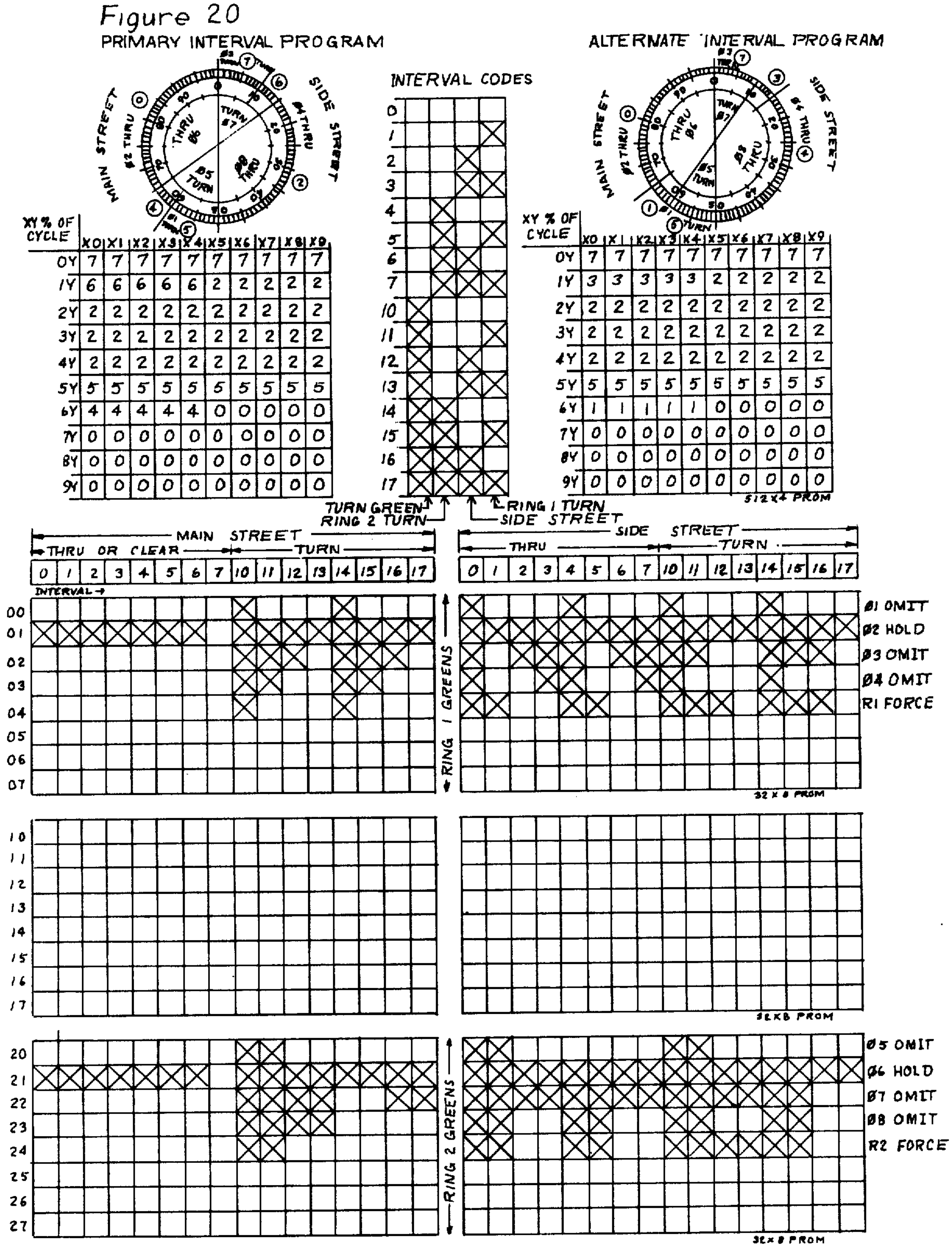

FIG. 20 shows a program for a pretimed controller unit of FIG. 18 to provide a controller assembly auxiliary coordinator unit for supervision of actuated controller cycle timing. As a coordinator unit the controller provides phase hold, phase omit and force off outputs to provide coordination within a signal system.

Table 1 shows master module (of FIG. 14) computer input/output assignments. Computer outputs are provided through normal F8 computer ports. A half port is used for input matrix addressing and an eight bit port is used for inputs from input matrix as indicated.

Table 2 shows phase module (of FIG. 16) computer input/output assignments. Computer outputs are provided through normal F8 computer ports. A half port is used for input matrix addressing and an eight bit port is used for inputs from input matrix as indicated.

Table 3 shows preemptor module (of FIG. 17) computer input/output assignments. Computer outputs are provided through normal F8 computer ports. A half port is used for input matrix addressing and an eight bit port is used for inputs from input matrix as indicated.

DESCRIPTION OF THE PREFERRED EMBODIMENT

Referring first to FIG. 1 there is shown a block diagram of a coordination unit, the input information required for logic system operation, and the relationship between receiver, modem, data input switches and logic system necessary for the synchronized timing function.

The broadcast time of day signal 1 is detected by an antenna system and converted to an audible signal 3 by receiver 2. A modem unit 4 decodes audible signal 3 into logic signals 5 for use by the logic system 6. The detecting, receiving and decoding of broadcast data is well known in the art and are not presented in further detail here.

External cycle select function 56 determines which of two operator paramiter input switches 7 or 8 will be active to input cycle length one 9 or cycle length two 10 data into the logic system 6.

External offset select signals 11, 12 or 13 determine which of three operator paramiter input switches 14, 15 or 16 will be active to input offset one 17, offset two 18 or offset three 19 data into the logic system 6. If no offset is selected the offset is a fixed value, such as 99%.

The logic system 6 has two outputs. The first output is a synchronization relay control signal 20 that is active for all but five seconds of the cycle. Relay contacts can be used for coordination purposes on pretimed controllers to stop timing at the offset point, or on actuated controllers to hold main street green until offset is attained. The second logic system output is a two digit binary coded decimal (BCD) percent of cycle clock 21, that can be used for the basis of a special digital pretimed controller.

FIG. 3 is a listing of the cycle lengths between 0 and 150 seconds that are divisible by ten and evenly divisible into an hour. These cycle lengths and their relationships are a basis for design simplicity. The table shows the frequency for which the minute counts are common with cycle counts. These frequencies, in seconds, are listed as a least common multiple. These frequencies are also listed as the number of marks between the common minute and cycle counts.

The minute count can be used on broadcast minute marks, utility frequency or crystal oscilator. To provide failsafe operation in the event of radio reception disturbances, this design bases the minute count on utility frequency data.

FIG. 2 is a block diagram of the logic system 6 of FIG. 1. Briefly, the logic of FIG. 2 operates as follows: A utility frequency or crystal oscillator clock 22 advances a counter 24 to divide the clock 22 into the broadcast independent clock 25. The broadcast independent clock 25 advances the time function 29, 45, 46 & 49 and the cycle counter 36, 28, 29, 30, 31 & 34. Time correction 5 from the broadcast standard time receiver, is applied to the time function to bring it into step with the broadcast standard time. The selected percent of cycle data 27 and broadcast independent clock 25 are applied to the cycle counter to generate a decimal percent of cycle function 21. Percent of cycle 21 is compared to the selected offset 39 to signify out of step function 41 which is applied to cycle correction 36, 44 & 54. Cycle correction applies a correction factor 33 to the cycle timer such that the cycle counter will be equal to the selected offset on sync signal.

Cycle length data 9 and 10 is combined by OR function 26 into a single data function 27 and fed to the cycle counter, and to a decoder function 29 that decodes the cycle length according to FIG. 3 for application to the cycle and minute counters.

The cycle counter consists of three counting functions. The first counter 28 utilizes the broadcast independent clock 25 and cycle length data 27 so that a function marks the passing of one percent of the preset cycle length. When the coordination unit is not in resync the 1.0% clock function 32 is passed through AND function 34 as an input 35 into the second cycle counter function 31 so that logic 43 is presented to mark a set function 44 that indicates time to resync 51.

The time function consists of two units. The first counter unit 45 utilizes the broadcast independent clock 25 such that a one minute function is presented to the second minute counter unit 46 along with the number of counts until in sync 48, according to the table of FIG. 3. The output of unit 46 is expanded to two seconds by logic element 49. Expanded output 50 is presented to reset function 44 so that resync 51 is released.

Master reset 23 is activated by power up or a switch input. This function sets a data check function 52. Broadcast time hour mark 5 will reset data check function 52, and also reset the time function 45 and 46. Once the time function is set in time it will remain in time with the broadcast time as long as utility power of the proper frequency is maintained.

In the cycle correction circuit when the resync 51, inhibit 52, offset attained 41, and a proper cycle length 53 function are active a function 33 is set to stop the percent of cycle counter 33 at the offset point until a proper minute mark 53 is attained. When a proper minute mark is attained, resync is reset and the cycle timing is permitted to continue because the cycle counter is in time.

To prevent excessive delays to traffic, there must be a limit to the length of time that the cycle timer is stopped by a counter 54 that counts broadcast independent clock 25 when cycle counter is halted. The counter function 55 is applied to reset inhibit 51 so that percent of cycle timer can resume timing.

This logic system can be implemented through a discrete component hardware system or a combination of hardware/software system. This logic system is one of several methods of generating controller coordination from broadcast time of day information.

Alternate implementation of the cycle counter can provide cycle lengths in addition to those listed in FIG. 3. The logic employed by the time function 45 & 46, decoder 29 and logic units 31, 44 & 49 effect a division of the minute of the hour by the selected cycle length 27 to generate the resync function 51 when the minute is evenly divisable by the cycle length and common reference is indicated between time function and the cycle counter. This logic system can be replaced with a logic system that divides the time by the cycle length so as to provide a function that indicates common reference between the time of year and the percent of cycle.

When transition smoothness is more important than logic density the resync function 51 can be changed from a stop timing function to a correction factor and a correction count. The correction factor is proportional to how far out of step the cycle counter is, and is added to the cycle length data 27 to change the percent of cycle advance rate until the percent of cycle counter is in step. The correction count is used to clear the correction factor after the correction factor has been applied the correct number of times to bring the percent of cycle timer into step.

Figure 4:
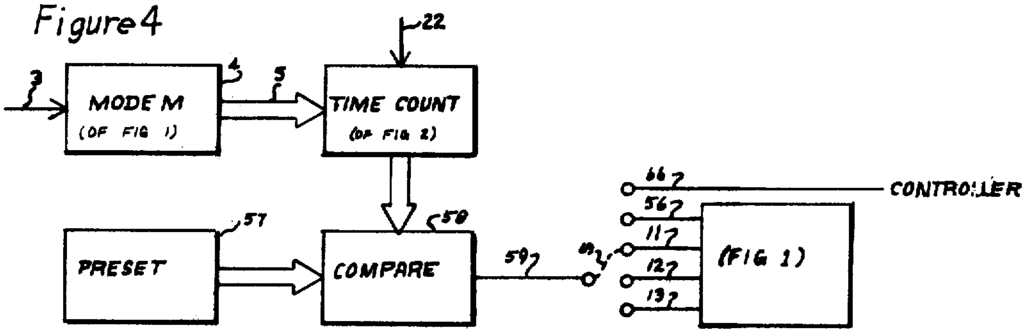
FIG. 4 shows relationship between a time of day counter of FIG. 2, preset time parameters, and a comparitor that generates an output when time of day lies within preset time paramiters, and how time of day function output can be jumper programed to provide changes in a timing plan.

Time program is generated as shown in FIG. 4 by comparing 58 the broadcast time of day 5 from the modem 4 with programmable time paramiters 57. When the time of day falls within time paramiters 57 an output 59 is activated. A plurality of such circuits are provided with the ability for jumper 69 programming ALTERNATE CYCLE LENGTH 56, ALTERNATE OFFSET 11, 12, or 13, and/or alternate splits through selection of controller alternate timing program 66.

Figure 5:
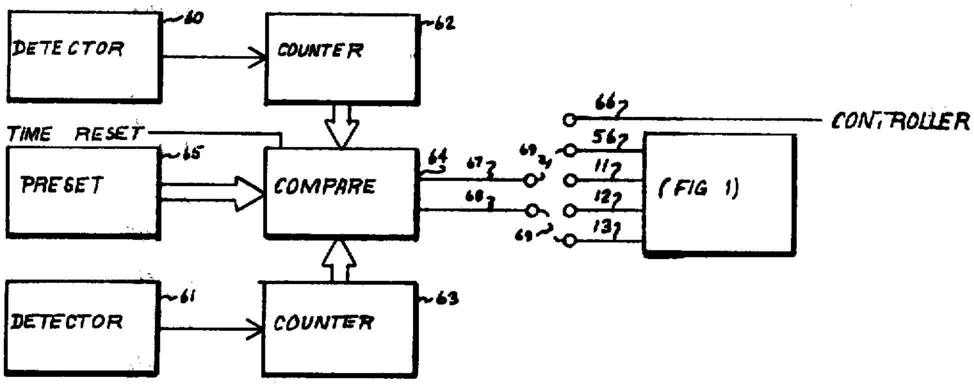
FIG. 5 shows time function means with detector inputs, counters, preset traffic count parameters and comparitor that generates outputs when counters exceed preset traffic count parameters, and how traffic function outputs can be jumper programed to provide changes in a timing plan.

Traffic programs are generated as shown in FIG. 5 through automatic detection techniques such as loop, magnetic, radar and sonar, which are well known in the art, and are used to detect traffic from a plurality of intersection approaches. Detector 60 & 61 inputs are used to count inbound 62 and outbound 63 traffic rates. Traffic rates are compared 64 to programable traffic parameters 65 to generate outputs 67 & 68 when total traffic exceeds a rate parameter and inbound rate exceeds outbound rate, or outbound rate exceeds inbound rate, by a programable percentage parameter. A plurality of such circuits are provided to enable jumper 69 programing of alternate cycle length 56, alternate offsets 11, 12 & 13 or alternate splits through selection of controller alternate timing program 66.

Referring next to FIG. 6 there is shown a system for input of option and parameter data for computers. The computer 1 has an associated control bus 2, address bus 3, and data bus 4, for intra-computer communication. The system for input of option and parameter data consists of address buffering 5, address decoding 6, diode matrix 7, data buffer 31, and associated driver transistors and resistors. The matrix 7 consists of several diode cells 8, 9, . . . 23. These diode cells are grouped into input registers with each input register containing an arbitrary number of diode cells n related to the processor data word length, such that there is one to one corelation between an arbitrary register cell j and a computer data bus bit j of the n bit computer data word. Any diode cell can be identified as $D_{ij}$ where i is the address of a unique register in the memory address space and j is the bit assignment on the computer data bus. Each of m input registers in the matrix has a unique assignment i so that the input register 0 is directly associated with an arbitrary address k on the computer address bus, the input register 1 is associated with address $k+1, \ldots$ input register i is associated with address $k+i, \ldots$ and input register m is associated with address $k+m$.

The address of the input matrix cell contained in the information on the address bus 3, is isolated by address buffering 5 from the address bus 3 under processor control from the control bus 2 to form the input register bus. Address information on the input register bus is decoded by the decoder 6 to select any of the input registers by activating one of the register driver transistors 24 so as to bring the register circuit to low logic level.

Each diode cell $D_{ij}$ with equal j data assignments are electrically connected to each other with anode side in common to form a data circuit. This data circuit is then connected through a buffer 31 to the j th bit of the data bus with a data assertion on the data bus 4 under processor control through control bus 2. Each diode cell $D_{ij}$ with equal i register assignments are connected to each other with cathode sides in common to form a register circuit this register circuit is tied to the collector of a transistor which is controlled by the address decoder 5 so that when the register is addressed, the register circuit is placed at low logic level through the transistor 24. Each diode cell $D_{ij}$ always presents a high impedance to current flow between cathode and anode. Each cell $D_{ij}$ presents low impedance to current flow between anode and cathode when the cell is active. For this discussion current flow is from the positive terminal to a less positive terminal.

A diode cell $D_{ij}$ cam provide for one bit of data input, depending on the type of input diode cell, through component placement at the time of assembly, parameter input under the control of the end user as input by switch means, external input of a logic signal that operates at a different DC reference level, or external input from an AC light source.

An input register can be addressed under processor control and any diode cell of the register can be checked by the processor to see if that diode cell is active. Based on the result of a diode cell check. the control of the processor can be transferred to an optional program of processor instruction so that the performance of the system can be changed as a result of the diode cell data check.

Referring next to figure 7 there is shown a diode cell for the input of option and parameter data at the time of circuit assembly. The diode cell consists of a printed circuit board location that is drilled and connected to other circuitry for the placement of a diode. On final assembly a diode can be installed to activate the diode cell, or a previously installed diode removed to deactivate the diode cell. The anode side of the diode 50 is connected to the assigned data circuit and the cathode side 51 is connected to the assigned input register circuit in the matrix to activate the diode cell.

Referring next to FIG. 8 there is shown a diode cell for the input of option and parameter data by a system operator. The diode cell consists of a diode 55 placed in series with a switch 56. The anode side 57 is connected to the assigned data circuit and the cathode side 58 is connected to the assigned input register circuit. The switch 56 can be closed by the operator to activate the cell.

Referring next to FIG. 9 there is shown a variation of FIG. 8 wherein a switch is placed in series with the diode to provide data input. The switching arrangement of FIG. 9 represents a thumbwheel or lever type of rotating switch, consisting of a wheel that can be rotated by the operator to one of several positions. The wheel has a series of burshes that are designed to make contact with conductor tracks on the printed circuit board. These conductor tracks are designed so that each position of the wheel is uniquely represented by a code of opened and closed contacts between the brushes and the conductor tracks. One of the conductor tracks 60 is connected to the cathode of a diode. The anode of each diode is connected to the assigned data circuit.

Referring next to FIG. 10 there is shown a diode cell for the external input of logic signal that operates at the same reference levels as the matrix. The diode cell consists of a two input OR gate. The OR gate is an integrated circuit logic device that is designed to provide a high level output whenever either of two input circuits receive a high level input. With the input of the OR gate as an open collector transistor, and the transistor emitter connected to low logic level so that when both inputs are active at low logic level the output will be tied to low logic level through the transistor. The OR gate is placed in the matrix with the output 70 connected to the assigned data circuit, one input 71 connected to the assigned input register circuit and the second input 72 connected to an external logic source that operates with compatible logic levels. When the OR gate is connected this way the external logic data is passed to the data bus when the register containing the OR gate is selected and the cell is active the cell will appear to contain a diode between the data circuit and the register circuit, with this cell activated in response to external logic data.

Now referring back to FIG. 6 with the diode cell 23 of the external logic OR gate input type per figure 10 described above, it should be noted that the OR gate transistor output 71 is connected to the pull up register 28 which ties the data circuit 27 to high logic signal 29 when none of the active cells on that data circuit are being addressed. Most of the integrated circuit OR gates that are available have internal circuitry to pull the output transistor to high logic level when either input is at high logic level. When these OR gates, with pull up circuitry, are used as a diode cell the pull up circuitry is parallel to the pull up resistor 28 and this parallel circuit does not effect input system performance.

Referring next to FIG. 11 there is shown a diode cell for the input of an external logic signal that operates at different DC reference levels. The diode cell consists of an opto-isolator with a light sensitive diode 77 connected into the matrix 7 of FIG. 6 with anode side 75 connected to the assigned data circuit and the cathode side 76 connected to the assigned register circuit. The primary light emitting diode is provided with current limiting from a resistor 77 and connected to the external logic source and external logic reference. When a signal is presented between the anode and cathode of the primary diode 78, light is emitted and conducted inside the opto-isolator to the secondary diode, activating the secondary diode.

Referring next to FIG. 12 there is shown a variation of FIG. 11 wherein a bridge rectifier is installed in the primary circuit with a filter and a spark gap surge arrestor to protect primary circuitry. The added circuitry provides a DC logic signal for input to opto-isolator as described above, but the full wave bridge rectifier will allow the input of AC line voltages as well as DC signals.

Referring back to FIG. 6 and an input register circuit transistor 24 which is activated to pull the input register circuit 26 to the low level logic state so that the diode cells that are active can pull their respective data circuits to the low logic state and data transfered to the processor over the data bus. A pull up resistor 30 is now envisioned in the data circuit pulling the collector of the register transistor 24 to high logic reference 29 when the transistor 24 is not active. Such a pull up resistor would be parallel to a diode cell 23 that is in series with another pull up resistor 28. This parallel circuit would not affect logic operation of the register circuit 26, the data circuit 27 or the matrix 7; if both circuits are at high level, the register circuit 26 is at low logic state and cell is inactive, or when data circuit 27 is low due to the selection of another register with an active cell on the same data circuit and current through the diode cell 23 is blocked by the nature of the diode. From this it is seen that the pull up resistor 30 does not affect the circuit operation except to increase register transistor 24 current flow when the transistor is active. As such the register transistor can be provided as part of a low logic true decoder 6 such that any one register circuit can be addressed by the processor over the address bus 3 and that register circuit be forced to active low to provide register data to the processor.

Microcomputer technology has provided systems that provide more accessible normal input/output means at the sacrifice of address bus access. For such systems the address bus and the data bus for the matrix system can be generated through normal input/output means indipendent of the computer system address and data bus.

Referring now to FIG. 13, there is shown a controller unit system incorporating coordination means with time of day broadcast reception, time program means, traffic program means, simplified inter-module communication means, overlap means, and preemption means in a controller unit system conformining to NEMA Standards. The controller unit consists of a master module 9 for coordination and phase sequencing, up to eight phase modules 1, 2, . . . 8 for interval timing, interval sequencing and load switch control, and a preemptor module 10 that provides overlap and preemptor functions. Included in a controller assembly, but not part of the controller unit are phase load switch drivers 34 which provide driving signals for phase signal displays 36 from phase signal load output circuits 32 of the controller unit. Load switches and other controller assembly details are provided in NEMA Standards.

The controller unit, FIG. 13, master module 9 is detailed in FIG. 14 to indicate computer 43, 44, 45 & 46, input matrix 47 & 49 (as in FIG. 6) software check 48, display 50, 51, 52 & 53, and output buffers 79. One of the controller unit phase modules 1, 2, . . . 8 is detailed in FIG. 16 to indicate computer 100 & 101, input matrix 102 & 103 (as in FIG. 6), software check 107, and output buffers 79. The controller unit preemptor module 10 is detailed in FIG. 17 to indicate computer 150, 151 & 152, input matrix 153 & 154 (as in FIG. 6), software check 163, overlap decoders 155, 156, . . . 162, and output buffers.

The master module, phase module and preemptor module each contains a real time computer designed to perform as custom discrete logic systems. The computer system of choice is the Fairchild F8 utilizing a 3850 Central Processor Unit (CPU) and 3851 Program Storage Units (PSU) to provide an eight bit processor, random access memory scratchpad, masked read only memory with a custom real time program, timer interrupts and input/output terminals.

Master module, FIG. 14, and overlap module, FIG. 17, have input/output requirements for a CPU and two PSU chips each. For the phase module of FIG. 16 a CPU and one PSU can be combined and provided on a Fairchild F3870 chip by eliminating access to computer control and data circuits. Each computer has software check means that require specific software execution before a specific time passes to keep controller from flashing mode.

In FIG. 14 a master module crystal 46 provides a 1,976,250 Hz. clock time base which is shaped by the CPU 43 and output 64 for phase module and preempt module clock source. In each computer this clock rate is divided by 7,905 in interrupt timers to provide interrupts at a rate of 250 Hz. The 250 Hz interrupts are counted by a real time program in each computer to advance internal timers and schedule the major subroutines of each real time program. Computer outputs are buffered 79 using integrated circuit buffers such as Ser. No. 75466 with pull up resistors to external or internal voltage reference levels, and provide common collector OR hookup capability for module outputs. Master module computer input/output is summarized in the MASTER MODULE COMPUTER INPUT/OUTPUT ASSIGNMENT TABLE, TABLE 1.

The master module of FIG. 14 utilizes the following NEMA Standards controller unit external inputs; RING 1 RED REST 69, RING 2 RED REST 70, RING 1 FORCE OFF 71, and RING 2 FORCE OFF 72. Inputs are terminated at input matrix 49, as shown in FIG. 11, and scheduled for periodic review by the computer real time program to cause the controller unit to perform as specified in NEMA Standards.

To master module utilizes the following coordinator external inputs; INBOUND DETECTOR CALL 73, OUTBOUND DETECTOR CALL 74, CYCLE LENGTH II 76, OFFSET II 77, OFFSET III 78, and DROP SYNC 68. Coordinator inputs are terminated at input matrix 49, as shown in FIG. 11, and scheduled for periodic review by the computer real time program. The inputs are compatible with NEMA Standard input/outputs. INBOUND DETECTOR CALL 73, and OUTBOUND DETECTOR CALL 74 are used for traffic functions as shown in FIG. 5.

The master module utilizes the following controller unit internal circuits: PREEMPT ACTIVE 75, RING 1 CHANGE 19, RING 2 CHANGE 20, PHASE 1, . . . 8 REQUEST 21, 22, . . . 28. Internal inputs are terminated at input matrix 49, as shown in FIG. 10, and scheduled for periodic review by the computer real time program.

The master module utilizes the following diode option inputs: FIXED TIME, DAYS OF WEEK and SINGLE RING. Diode option inputs are provided in input matrix 49, as shown in FIG. 7, and scheduled for review as needed by the real time program. FIXED TIME changes the MASTER PSU 44 Port A outputs 39 to reflect the data on a percent of cycle timer within the computer rather than PHASE n NEXT when cell is activated by placement of a diode. SINGLE RING provides a change in controller unit program from a dual ring mode to a sequential eight phase mode when the cell is activated by placement of a diode. DAY OF WEEK is a seven cell option register used in controlling FUNCTION VII, VIII & IX time of day outputs.

The master module utilizes the following diode parameter inputs: FUNCTION IV, V, . . . IX PARAMETER, LOCAL TIME PARAMETER, and TRAFFIC PROGRAM PARAMETER. Diode parameter inputs are provided in input matrix 49, as shown in FIG. 7, and scheduled for review as needed by the real time program.

The master module provides for input of DAYLIGHT SAVINGS and ADVANCE DAY operator options that are terminated at input matrix 49, as shown in FIG. 8, and scheduled for review as needed by the real time program. Activation of DAYLIGHT SAVINGS advances the local time counter by one hour. The master module provides a day of the week counter in the local timer for scheduling day of week functions that is not reset by broadcast time. The ADVANCE DAY operator input is provided to manually reset the day of week counter.

The master module utilizes the following operator parameter inputs: CYCLE LENGTH, ALTERNATE CYCLE LENGTH, OFFSET I, OFFSET II, and OFFSET III. Operator parameter inputs are terminated at input matrix 49, as shown in FIG. 8 or 9, and scheduled by the computer real time program to determine a background cycle length as defined by the CYCLE LENGTH input and the offset time relationship, expressed in percent of cycle length, determined by the difference between end of coordinated phase green and a system reference point based on broadcast time.

The master module provides the following coordinator outputs: SYNCHRONIZATION 59, INBOUND FUNCTION 80, OUTBOUND FUNCTION 81, MORNING TIME FUNCTION 82, EVENING TIME FUNCTION 83, NIGHT TIME FUNCTION 84, FUNCTION VII 85, FUNCTION VIII 86, and FUNCTION IX 87. FUNCTION VII, VIII & IX are time functions with special day of week capability. Coordination outputs originate at the computer under real time program control to provide cycle program, traffic program (FIG. 5), and time program (FIG. 4) outputs.

The master module provides the following controller unit internal signals: FLASH RATE 61, PHASE 1 CONTROL 11, PHASE 2 CONTROL 12, PHASE 3 CONTROL 13, PHASE 4 CONTROL 14, PHASE 5 CONTROL 15, PHASE 6 CONTROL 16, PHASE 7

CONTROL 17, and PHASE 8 CONTROL 18. Outputs originate at the computer under real time program to provide phasing as shown in FIG. 15.

The master module, FIG. 14, CPU 43 real time program schedules input of radio receiver data 67 to shift the serial UTS broadcast time into scratchpad memory. Once a minute, at broadcast minute or hour mark, serial UTS broadcast time is compared with the data received last minute. The time program advances the local time counter and a cycle timer independently from the reception of broadcast data. When serial UTS broadcast time checks with data received last minute a LOCAL TIME PARAMITER, five bit binary value between 0 and 32, is added to broadcast time hour to compute local standard time, which is incrimented by an hour if DAYLIGHT SAVINGS operator option is activated and a check is made against the local time counter. If local time agrees with corrected broadcast time, the time is checked for common cycle reference through division by effective cycle length as shown in FIG. 2. If time does not agree with broadcast time the local time counter is reset. When time is in common cycle reference, as indicated by no remainder from the division, the data on the cycle counter is checked to compute correction factor and correction count required to bring cycle counter into step within 2½ cycles of the cycle timer. SYNCHRONIZATION output 59 is activated when percent of cycle timer lies between 10% and 99% unless DROP SYNC input 68 is activated. DROP SYNC input 68 is activated to disable SYNCHRONIZATION output 59 without regard for the data on the percent of cycle counter. SYNCHRONIZATION output 59 may be jumper programed to a phase module HOLD input, FIG. 16 item 112, to provide coordination of main street green termination when there is opposing phase demand. Time program or traffic program outputs may be jumper programed to DROP SYNC 68 input to "float" intersection off of coordination and accomidate saturation or low traffic conditions more effectively.

Master module traffic parameter inputs include sixteen possible traffic count values and sixteen possible traffic split parameter values. The sixteen possible traffic count values are selectable by placing different combinations of diodes in four diode matrix input cells as shown in FIG. 7 to program the value of total inbound and outbound detector activations in equal 600 vehicle per hour increment values between 00 and 9000 vehicles per hour.

The sixteen possible traffic split parameter values are selectable by placing different combinations of diodes in four diode matrix input cells as shown in FIG. 7 to program the value of split for inbound or outbound to total inbound and outbound count in equal 3⅓ percent increment values between 00 and 50%. To activate INBOUND FUNCTION 80 the number of activations at INBOUND DETECTOR CALL 73 and OUTBOUND DETECTOR CALL 74 in the ten minutes of local time interval, must exceed the rate indicated by the traffic count parameter value and the number of activations at INBOUND DETECTOR CALL 74 must exceed the total number of inbound and outbound activations by at least the traffic split parameter value.

INBOUND 80 and OUTBOUND 81 traffic functions can be programmed by installation of jumpers on the master module, within the controller unit or within the controller assembly to CYCLE LENGTH II 76, OFFSET II 70, OFFSET III 71, or phase module MAX II for alternate split, or a combination of alternate cycle length, offset and split to provide changes in the signal timing program at each of several intersections within a signal system that will accommodate detected changes in traffic flow patterns. MORNING TIME FUNCTION 82, EVENING TIME FUNCTION 83, and NIGHT TIME FUNCTION 83 are generated by comparing the local time of day counter with time parameters. When the local time of day falls within the value indicated by FUNCTION IV PARAMETER the MORNING TIME FUNCTION 82 is activated, within the value indicated by FUNCTION V PARAMETER the EVENING TIME FUNCTION 83 is activated, and within the value indicated by FUNCTION VI PARAMETER the NIGHT TIME FUNCTION 84 is activated.

FUNCTION VII 85, FUNCTION VIII 86, and FUNCTION IX 87 are time parameters generated by comparing the local time of day counter with time parameters. When the day of week counter data is not indicated by diode placement in DAY OF WEEK diode option register and the local time of day falls within the value indicated by a parameter input the function is activated.

Any of the time of day functions 82, 83, . . . 87 can be jumper programed on the master module, within the controller unit, or in the controller assembly wiring to CYCLE LENGTH II 76, OFFSET II 70, OFFSET III 71, or phase module MAX II for alternate split to provide changes in signal timing program at each of several intersections within a signal system that will accomadate detected changes in traffic flow patterns as shown in FIG. 5.

FIG. 15 illustrates the time relationships of intermodule communications for a ring of controller phase and interval sequencing, with active state indicated by low level signal. The drawing also indicates signal displays of the four phases in the ring. RING CHANGE 19 is generated by each phase module and common collector negative logic OR connected, as shown in FIG. 13 to indicate the completion of green timing or the timing of yellow change or red clearance intervals to the master module. RING CHANGE 19 will cause deactivation of PHASE CONTROL 11, 12, 13 or 14 if opposing demand exists and will inhibit activation of the next PHASE CONTROL until RING CHANGE is deactivated by the phase in control.

PHASE REQUEST 21, 22, 23 and 24 are activated by phase modules to register servicable demand to the master module so that PHASE CONTROL can be scheduled in the phase sequence for the ring as specified in NEMA Standards. PHASE CONTROL activation will cause deactivateion of PHASE REQUEST in the phase module. Deactivation of PHASE CONTROL mandates termination of green display unless phase module is in INITIAL, WALK, or PEDESTRIAN CLEARANCE intervals, for which the green display will be terminated as soon as interval timings are complete.

Phase module implementation is demonstrated in FIG. 16 with computer input/output summarized in the PHASE MODULE COMPUTER INPUT/OUTPUT ASSIGNMENT TABLE, TABLE 2.

The phase module utilizes the following NEMA Standard controller unit external inputs; VEHICLE DETECTOR CALL 110, PEDESTRIAN DETECTOR CALL 111, HOLD 112, PHASE OMIT 113, INHIBIT MAX TERMINATION 114, OMIT RED CLEARANCE 115, STOP TIMING 116, INTERVAL ADVANCE 117, CALL TO NON ACTUATED MODE I & MODE II 118 & 119. Inputs are terminated at input matrix 103, as shown in FIG. 11, and scheduled for periodic review by the computer real time program to cause the controller to perform as specified in NEMA Standards.

The phase module utilizes RING CHECK 139 and PHASE CONTROL 11 controller unit internal circuit inputs, terminated at input matrix 103 as shown in FIG. 10, and scheduled for periodic review by the computer real time program, to generate proper interval sequencing.

The phase module provides EXCLUSIVE PED diode option in input matrix 103, terminated as shown in FIG. 11 and scheduled for review as needed by the computer real time program to select an interval sequence and display plan that provides exclusive pedestrian phase prior to vehicular right-of-way displays when there is pedestrian demand and cell is activated by diode.

The phase module provides for input of the following operator time settings parameters; INITIAL, EXTENSION, MAXIMUM, (SECOND MAXIMUM), YELLOW CHANGE, RED CLEARANCE, WALK, PEDESTRIAN CLEARANCE, MAXIMUM INITIAL, ADDED INITIAL PER ACTUATION, MINIMUM GAP, and TIME TO REDUCE TO MINIMUM GAP. Operator parameter inputs are terminated at input matrix 103, as described in FIG. 8 or 9, and scheduled for review as needed by the real time program to generate interval timing as specified in NEMA Standards.

The phase module generates the following NEMA Standards controller unit outputs; BASIC VEHICLE LOAD SWITCH DRIVERS 130, 131 & 132, PEDESTRIAN LOAD SWITCH DRIVERS 133, 134 & 143, CHECK 140, and PHASE ON 142. Outputs originate at the computer under real time program control and are buffered to perform as specified in NEMA Standards.

VEHICLE CALL 146, PEDESTRIAN CALL 147, MAX TERMINATION 144, GAP TERMINATION 145 and STATUS BITS A, B & C 135, 136 & 137 display circuits originate at the computer under real time program control to provide drive for displays specified in NEMA Standards. A numeric display for ring intervals are coded as follows: RED REST 0, WALK 1, WALK HOLD 2, PEDESTRAIN CLEARANCE 3, EXTENSIBLE GREEN 4, GREEN REST 5, YELLOW CHANGE 6, and RED CLEARANCE 7. Computer outputs are buffered and extended to phase module terminal for coordination and overlap uses.

The phase module provides output of controller unit internal circuits to indicate EXCLUSIVE PEDESTRAIN 141, and RING CHECK 139. RING CHECK is common collector negative OR connected with other phase modules and input to input matrix 103 as shown in FIG. 10 for use in timing maximum green according to NEMA Standards. EXCLUSIVE PEDESTRIAN is used to inhibit overlap display during exclusive pedestrian displays.

When computer is implemented on the F3870 chip the port four TEST output 106 can be provided to trigger a one shot timer, in lieu of software check 107, to keep controller from dropping to flashing mode.

Preemptor module implementation is demonstrated on FIG. 17 with computer input/output summarized in the PREEMPTOR MODULE COMPUTER INPUT/OUTPUT ASSIGNMENT TABLE, TABLE 3. The preemptor module utilizes the following controller unit internal circuits: RING 1 CHANGE 19, RING 2 CHANGE 20, RING 1 STATUS BITS 135, 136 & 137, RING 2 STATUS BITS 164, 165 & 166, RING 1 EXCLUSIVE PEDESTRIAN 142, and RING 2 EXCLUSIVE PEDESTRIAN 167. Inputs are terminated at input matrix 154, as shown in FIG. 10, and scheduled for periodic review by the computer real time program to generate overlaps and preemptor special program.

The preemptor module provides eight OVERLAP VEHICLE LOAD SWITCH DRIVERS. The first four overlap phases 171, 172, 173 & 174 perform as specified in NEMA Standards. The second four can be scheduled for NORMAL RING 2 VEHICLE LOAD SWITCH DRIVERS to output phase 5, 6, 7 & 8 controller unit outputs by following RING 2 STATUS BITS A, B & C 164, 165 & 166 and PHASE ACTIVE circuits to repeat the phase module BASIC VEHICLE LOAD SWITCH DRIVERS 130, 131 & 132, or scheduled to develop additional overlaps. A sixty four (eight by eight) bit bit diode matrix, with inputs as assigned on table 3, is provided in the input matrix 204, as shown in FIG. 7, to relate controller unit phase module normal vehicle displays to overlap phase outputs. EXCLUSIVE PEDESTRIAN 142 & 167 internal circuits are monitored to inhibit overlap right-of-way display when a phase is displaying exclusive pedestrian indications.

The preemptor module will generate a two phase preemption special program. The first preemption phase is a pretimed clearance phase, and the second preemption phase is for the movements allowed during preemption. Diode paramiter inputs are privided in the input matrix 154, as shown in FIG. 7, to select phases for clearance, phases for preemption, clearance phase green duration, and minimum preemption green duration. An option provides master phase outputs.

PREEMPT REQUEST 168 is terminated at input matrix 154, as shown in FIG. 11, and scheduled for periodic review by the computer real time program to initiate and retain the special preemptor program. The preemptor module generates an output signal PREEMPT ACTIVE 75 to indicate that the phase sequencing is being determined by the special preemptor program. Upon activation of PREEMPT ACTIVE 75 the master module 9 deactivates all PHASE CONTROL 11, 12, . . . 18 circuits so that preemptor module can assume control of these circuits to accomplish special preemptor phasing.

FIG. 18 shows a pretimed controller unit that includes a master module 9 and a pretimed program module. The master module 9, as shown in FIG. 14, is programed with FIXED TIME option cell activated by placement of a diode to accomplish the output of the data on the percent of cycle counter on PHASE NEXT output driver 39. The pretimed program module includes output buffers 79, zero percent decoder 184, interval program decoder 180, signal program decoders 181, 182 & 183, alternate interval program 188, alternate signal program 197, and input buffers 186 such as 75467 integrated circuits.

A zero percent decoder 184, using an integrated circuit such as a 54/74151 one of eight decoder, output is used to clock alternate interval program 188 and alternate signal program 190 through integrated circuits such as 54/74175 clocked "D" latches 187 & 195 so that signal program changes are made at a preselected point in the cycle.

The percent of cycle data 39 is used to address one of a hundred registers in cycle counter data decoder 180, an integrated circuit such as a 82S131 512×4 bit programmable read only memory circuit programmed with up to sixteen cocdes for signal display interval numbers. An alternate set of one hundred registers can be selected by input of alternate interval program 238 as an address input. Signal display interval data 185 is input to phase interval data decoders 181, 182 & 183 which are integrated circuits such as 82S123, 32×8 bit programmable read only memory circuits programed with signal display data for phase signal load outputs 148 to control phase load switch drivers. An alternate program of sixteen signal display intervals can be selected by input of ALTERNATE SIGNAL PROGRAM 197 as an address input 198 to the signal program decoders 181, 182 & 183.

A flash option switch 189 provides for application of FLASH RATE 61 to a signal program decoder 183 to alternately enable and disable all outputs of that decoder and flash signal displays as used for walk and pedestrian clearance displays.

FIG. 19 shows a PROM program table for the pretimed controller unit of FIG. 18. Primary and alternate interval programs are asserted in the cycle counter data decoder 180, and primary and alternate signal programs are asserted in signal program decoder 181 for main street, 182 for side street, and 183 for flashing pedestrian signal displays as shown. The program provides a two phase signal sequence with pedestrian displays on primary interval and signal programs. Side street turn lane detector activation is applied as ALTERNATE INTERVAL PROGRAM input 188 to provide a three phase signal sequence in response to turn demand. Main street turn lane detector activation is applied as ALTERNATE SIGNAL PROGRAM input 197 to provide a second three phase signal sequence in response to turn demand. With side and main turn activations, a four phase signal sequence is provided. FIG. 19 pretimed control program demonstrates expanded capability of this controller over state of art mechanical pretimed controllers.

Split option switches 190, 191, 192, 193 & 196 are provided for a transfer of the pretimed program module to provide an auxiliary unit for actuated controller unit coordination with split capability in which turn greens and side street greens are monitored to determine controller unit state when a controller unit does not include coordination means. MAIN STREET TURN GREENS 120 & 123 and SIDE STREET TURN GREEN 122 & 125 are negative logic diode OR gated to generate RING 1 TURN 126 and RING 2 TURN 127 circuits. SIDE STREET THRU GREENS 121 & 124 and SIDE STREET TURN GREENS 122 & 125 are negative logic diode OR gated to generate SIDE STREET TURN GREEN 200. Three of the interval program decoder 180 outputs are programed to generate RING 1 TURN ALLOWED 129, RING 2 TURN ALLOWED 128, and SIDE STREET ALLOWED 199 circuits. Movements allowed 128, 129 & 199 and phase green 126, 127 & 200 circuits are used for addressing signal program decoders 181 & 183 to output PHASE OMIT, PHASE HOLD and FORCE OFF coordination unit outputs. FIG. 20 shows a PROM program table for the pretimed controller unit of FIG. 18, switched and programed to provide actuated controller unit split outputs. Primary and alternate interval programs are asserted in the cycle counter data decoder 180, and primary and alternate signal programs are asserted in signal program decoder 181 for ring one, and 183 fro ring to PHASE OMIT, PHASE HOLD and FORCE OFF outputs as shown. Primary interval program provides longer phase 5 and phase 7 turn timing, and alternate interval program provides longer phase 1 and phase 3 turn timing, with alternate interval program called by input from time of day or traffic responsive input with offsets and splits as programed by end user. When master module is used for percent of cycle output a diode option of the phase module will provide PHASE CONTROL 11, . . . 18 and PHASE NEXT 39 outputs as described for FIG. 14 and FIG. 15.

TABLE 1

| REGISTER/BIT | MASTER MODULE COMPUTER INPUT/OUTPUT ASSIGNMENT TABLE | | | | | | | |
|---|---|---|---|---|---|---|---|---|
| | 0 | 1 | 2 | 3 | 4 | 5 | 6 | 7 |
| CPU | PORT A - ADDR 00 | | PORT B - ADDR 01 | | | | | |
| PORT A | MUX INPUT 0 | MUX INPUT 1 | MUX INPUT 2 | MUX INPUT 3 | MUX INPUT 4 | MUX INPUT 5 | MUX INPUT 6 | MUX INPUT 7 |
| PORT B | 1 MUX ADDR | 2 MUX ADDR | 4 MUX ADDR | 8 MUX ADDR | SYNC | FLASH RATE | SPARE | PULSED SERIAL |
| MASTER PSU | PORT A - ADDR 08 | | PORT B - ADDR 09 | | INTERRUPT CONTROL - ADDR 0A | | TIMER REGISTER - ADDR 03 | |
| MEMORY | TIMER VECTOR - 0340 | | INTERRUPT CONTROL - 03CO | | ROM - 0000 to 03FF | | | |
| PORT A | PHASE 1 NEXT | PHASE 2 NEXT | PHASE 3 NEXT | PHASE 4 NEXT | PHASE 5 NEXT | PHASE 6 NEXT | PHASE 7 NEXT | PHASE 8 NEXT |
| PORT B | $\phi$1 CONTROL | $\phi$2 CONTROL | $\phi$3 CONTROL | $\phi$4 CONTROL | $\phi$5 CONTROL | $\phi$6 CONTROL | $\phi$7 CONTROL | $\phi$8 CONTROL |
| DISPLAY PSU | PORT A - ADDR 20 | | PORT B - ADDR 21 | | INTERRUPT CONTROL - ADDR 22 | | TIMER REGISTER - ADDR 23 | |
| MEMORY | TIMER VECTOR - 0320 | | INTERRUPT CONTROL - 03AO | | ROM - 4000 to 07FF | | | |
| PORT A | DISP ADDR 1 | DISP ADDR 2 | DISP ADDR 4 | DISP STROBE | DISP DIGIT 1 | DISP DIGIT 2 | DISP DIGIT 4 | DISP DIGIT 8 |
| PORT B | INBOUND | OUTBOUND | MORNING | EVENING | NIGHT | FUNCTION 7 | FUNCTION 8 | FUNCTION 9 |
| INPUT MATRIX | | | | | | | | |
| REGISTER 0 | 10 CYC LEN 1 | 20 CYC LEN 1 | 40 CYC LEN 1 | 80 CYC LEN 1 | 10 CYC LEN 2 | 20 CYC LEN 2 | 40 CYC LEN 2 | 80 CYC LEN 2 |
| REGISTER 1 | 1 OFFSET 1 | 2 OFFSET 1 | 4 OFFSET 1 | 8 OFFSET 1 | 10 OFFSET 1 | 20 OFFSET 1 | 40 OFFSET 1 | 80 OFFSET 1 |
| REGISTER 2 | 1 OFFSET 2 | 2 OFFSET 2 | 4 OFFSET 2 | 8 OFFSET 2 | 10 OFFSET 2 | 20 OFFSET 2 | 40 OFFSET 2 | 80 OFFSET 2 |
| REGISTER 3 | 1 OFFSET 3 | 2 OFFSET 3 | 4 OFFSET 3 | 8 OFFSET 3 | 10 OFFSET 3 | 20 OFFSET 3 | 40 OFFSET 3 | 80 OFFSET 3 |
| REGISTER 4 | CYC LEN 2 | OFFSET 2 | OFFSET 3 | PREEMPT ACT | R1 RED REST | R2 RED REST | R1 FORCE OFF | R2 FORCE OFF |
| REGISTER 5 | 0500–0645 AM | 0645–0730 AM | 0730–0815 AM | 0815–0900 AM | 0900–0945 AM | 0945–1030 AM | 1030–1115 AM | 1115–1200 AM |
| REGISTER 6 | 1445–1530 PM | 1530–1615 PM | 1615–1700 PM | 1700–1745 PM | 1745–1830 PM | 1830–1915 PM | 1915–2000 PM | 2000–2045 PM |
| REGISTER 7 | 1900–2030 NT | 2030–2200 NT | 2200–2330 NT | 2330–0100 NT | 0100–0230 NT | 0230–0400 NT | 0400–0530 NT | 0530–0700 NT |
| REGISTER 8 | SUNDAY | MONDAY | TUESDAY | WEDNESDAY | THURSDAY | FRIDAY | SATURDAY | DLT SVG TIME |
| REGISTER 9 | 0730–0815 F7 | 0815–0900 F7 | 0900–1100 F7 | 1130–1230 F7 | 1230–1330 F7 | 1330–1600 F7 | 1600–1645 F7 | 1645–1730 F7 |
| REGISTER A | 0600–0715 F8 | 0715–0745 F8 | 0745–0815 F8 | 0815–0845 F8 | 0845–0930 F8 | 0930–1030 F8 | 1030–1130 F8 | 1130–1230 F8 |
| REGISTER B | 1130–1215 F9 | 1215–1330 F9 | 1330–1545 F9 | 1545–1645 F9 | 1645–1715 F9 | 1715–1745 F9 | 1745–1830 F9 | 1830–1930 F9 |
| REGISTER C | UTS + 1 HR | UTS + 2 HRS | UTS + 4 HRS | UTS + 8 HRS | UTS + 16 HRS | FIXED TIME | SINGLE RING | DROP SYNC |
| REGISTER D | $\phi$1 REQUEST | $\phi$2 REQUEST | $\phi$3 REQUEST | $\phi$4 REQUEST | $\phi$5 REQUEST | $\phi$6 REQUEST | $\phi$7 REQUEST | $\phi$8 REQUEST |
| REGISTER E | 600 COUNT | 1200 COUNT | 2400 COUNT | 4800 COUNT | 3.3% SPLIT | 6.7% SPLIT | 13.3% SPLIT | 26.7% SPLIT |
| REGISTER F | INBD DETECTOR | OTBD DETECTOR | WWV 1000 HZ | WWV 1500 HZ | WWV 100 HZ | ADV DAY COUNT | R1 CHANGE | R2 CHANGE |

TABLE 2

PHASE MODULE COMPUTER INPUT/OUTPUT ASSIGNMENT TABLE

| REGISTER/BIT | 0 | 1 | 2 | 3 | 4 | 5 | 6 | 7 |
|---|---|---|---|---|---|---|---|---|
| CPU | PORT A - ADDR 00 | | PORT B - ADDER 01 | | | | | |
| PORT A | MUX INPUT 0 | MUX INPUT 1 | MUX INPUT 2 | MUX INPUT 3 | MUX INPUT 4 | MUX INPUT 5 | MUX INPUT 6 | MUX INPUT 7 |
| PORT B | 1 MUX ADDR | 2 MUX ADDR | 4 MUX ADDR | 8 MUX ADDR | RING CHANGE | REQUEST | SPARE | SPARE |
| PHASE PSU | PORT A - ADDR 04 TIMER VECTOR - | | PORT B - ADDR 05 INTERRUPT VECTOR - | | INTERRUPT CONTROL - ADDR 06 ROM - 0000-07FF | | TIMER REGISTER - ADDR 07 | |
| PORT A | PHASE CHECK | PHASE ACTIVE | EX PED | PED CLEAR | GAP TERM | GAP TERM | VEH CALL | PED CALL |
| PORT B | RED | YELLOW | GREEN | DONT WALK | WALK | A STATUS | B STATUS | C STATUS |
| INPUT MATRIX | | | | | | | | |
| REGISTER 0 | 1 WALK | 2 WALK | 4 WALK | 8 WALK | 10 WALK | 20 WALK | 40 WALK | 80 WALK |
| REGISTER 1 | 1 PED CLR | 2 PED CLR | 4 PED CLR | 8 PED CLR | 10 PED CLR | 20 PED CLR | 40 PED CLR | 80 PED CLR |
| REGISTER 2 | 0.1 YELLOW | 0.2 YELLOW | 0.4 YELLOW | 0.8 YELLOW | 1.0 YELLOW | 2.0 YELLOW | 4.0 YELLOW | 8.0 YELLOW |
| REGISTER 3 | 0.1 RED CLR | 0.2 RED CLR | 0.4 RED CLR | 0.8 RED CLR | 1.0 RED CLR | 2.0 RED CLR | 4.0 RED CLR | 8.0 RED CLR |
| REGISTER 4 | 1 MIN INIT | 2 MIN INIT | 4 MIN INIT | 8 MIN INIT | 10 MIN INIT | 20 MIN IN IT | 40 MIN INIT | 80 MIN INIT |
| REGISTER 5 | 0.1 MAX GAP | 0.2 MAX GAP | 0.4 MAX GAP | 0.8 MAX GAP | 1.0 MAX GAP | 2.0 MAX GAP | 4.0 MAX GAP | 8.0 MAX GAP |
| REGISTER 6 | 1 MAX I | 2 MAX I | 4 MAX I | 8 MAX I | 10 MAX I | 20 MAX I | 40 MAX I | 80 MAX I |
| REGISTER 7 | 1 MAX II | 2 MAX II | 4 MAX II | 8 MAX II | 10 MAX II | 20 MAX II | 40 MAX II | 80 MAX II |
| REGISTER 8 | 1 MAX INIT | 2 MAX INIT | 4 MAX INIT | 8 MAX INIT | 10 MAX INIT | 20 MAX INIT | 40 MAX INIT | 80 MAX INIT |
| REGISTER 9 | 0.1 ADD INIT | 0.2 ADD INIT | 0.4 ADD INIT | 0.8 ADD INIT | 1.0 ADD INIT | 2.0 ADD INIT | 4.0 ADD INIT | 8.0 ADD INIT |
| REGISTER A | 0.1 MIN GAP | 0.2 MIN GAP | 0.4 MIN GAP | 0.8 MIN GAP | 1.0 MIN GAP | 2.0 MIN GAP | 4.0 MIN GAP | 8.0 MIN GAP |
| REGISTER B | 1 GAP TIME | 2 GAP TIME | 4 GAP TIME | 8 GAP TIME | 10 GAP TIME | 20 GAP TIME | 40 GAP TIME | 80 GAP TIME |
| REGISTER C | 1 TI BEF RE | 2 TI BEF RE | 4 TI BEF RE | 8 TI BEF RE | 10 TI BEF RE | 20 TI BEF RE | 40 TI BEF RE | 80 TI BEF RE |
| REGISTER D | VEH RECALL | VEH MEMORY | PED RECALL | EXCLUSIVE PED | CNI I | CNI II | MAN ENABLE | PED RECYCLE |
| REGISTER E | VEH CALL | MAX II | PED CALL | REST HOLD | RING CHECK | ADVANCE | PHASE NEXT | CONTROL |
| REGISTER F | OMIT PED | OMIT MAX TERM | OMIT ALL RED | OMIT PHASE | OMIT RECYCLE | REST IN WALK | STOP TIMING | SPARE |

TABLE 3

| PREEMPTOR MODULE COMPUTER INPUT/OUTPUT ASSIGNMENT TABLE | | | | | | | | |
|---|---|---|---|---|---|---|---|---|
| REGISTER/BIT | 0 | 1 | 2 | 3 | 4 | 5 | 6 | 7 |
| CPU | PORT-ADDR 00 | | PORT B-ADDR 01 | | | | | |
| PORT A | MUX INPUT 0 | MUX INPUT 1 | MUX INPUT 2 | MUX INPUT 3 | MUX INPUT 4 | MUX INPUT 5 | MUX INPUT 6 | MUX INPUT 7 |
| PORT B | 1 MUX ADDR | 2 MUX ADDR | 4 MUX ADDR | 8 MUX ADDR | R1 ADVANCE | R2 ADVANCE | PREEMPT FLAG | STOP TIMING |
| PREEMPT PSU | PORT A-ADDR 08 | | PORT B-ADDR 09 | | INTERRUPT CONTROL-ADDR 0A | | TIMER REGISTER-ADDR 0B | |
| MEMORY | TIMER VECTOR-0340 | | INTERRUPT VECTOR-0300 | | ROM-0000 to 03FF | | | |
| PORT A | PHASE 1 NEXT | PHASE 2 NEXT | PHASE 3 NEXT | PHASE 4 NEXT | PHASE 5 NEXT | PHASE 6 NEXT | PHASE 7 NEXT | PHASE 8 NEXT |
| PORT B | φ1 CONTROL | φ2 CONTROL | φ3 CONTROL | φ4 CONTROL | φ5 CONTROL | φ6 CONTROL | φ7 CONTROL | φ8 CONTROL |
| OVERLAP PSU | PORT A-ADDR 20 | | PORT B-ADDR 21 | | INTERRUPT CONTROL-ADDR 22 | | TIMER REGISTER-ADDR 23 | |
| MEMORY | TIMER VECTOR-0320 | | INTERRUPT CONTROL-03A0 | | ROM-0400 to 07FF | | | |
| PORT A | OLA GREEN | OLA YELLOW | OLB GREEN | OLB YELLOW | OLC GREEN | OLC YELLOW | OLD GREEN | OLD YELLOW |
| PORT B | OLE GREEN | OLE YELLOW | OLF GREEN | OLF YELLOW | OLG GREEN | OLG YELLOW | OLH GREEN | OLH YELLOW |
| INPUT MATRIX | | | | | | | | |
| REGISTER 0 | R1 A STATUS | R1 B STATUS | R1 C STATUS | R1 EX PED | R2 A STATUS | R2 B STATUS | R2 C STATUS | R2 EX PED |
| REGISTER 1 | φ1 ACTIVE | φ2 ACTIVE | φ3 ACTIVE | φ4 ACTIVE | φ5 ACTIVE | φ6 ACTIVE | φ7 ACTIVE | φ8 ACTIVE |
| REGISTER 2 | φ1 NEXT | φ2 NEXT | φ3 NEXT | φ4 NEXT | φ5 NEXT | φ6 NEXT | φ7 NEXT | φ8 NEXT |
| REGISTER 3 | φ1 REQUEST | φ2 REQUEST | φ3 REQUEST | φ4 REQUEST | φ5 REQUEST | φ6 REQUEST | φ7 REQUEST | φ8 REQUEST |
| REGISTER 4 | φ1 ON OLA | φ2 ON OLA | φ3 ON OLA | φ4 ON OLA | φ5 ON OLA | φ6 ON OLA | φ7 ON OLA | φ8 ON OLA |
| REGISTER 5 | φ1 ON OLB | φ2 ON OLB | φ3 ON OLB | φ4 ON OLB | φ5 ON OLB | φ6 ON OLB | φ7 ON OLB | φ8 ON OLB |
| REGISTER 6 | φ1 ON OLC | φ2 ON OLC | φ3 ON OLC | φ4 ON OLC | φ5 ON OLC | φ6 ON OLC | φ7 ON OLC | φ8 ON OLC |
| REGISTER 7 | φ1 ON OLD | φ2 ON OLD | φ3 ON OLD | φ4 ON OLD | φ5 ON OLD | φ6 ON OLD | φ7 ON OLD | φ8 ON OLD |
| REGISTER 8 | φ1 ON OLE | φ2 ON OLE | φ3 ON OLE | φ4 ON OLE | φ5 ON OLE | φ6 ON OLE | φ7 ON OLE | φ8 ON OLE |
| REGISTER 9 | φ1 ON OLF | φ2 ON OLF | φ3 ON OLF | φ4 ON OLF | φ5 ON OLF | φ6 ON OLF | φ7 ON OLF | φ8 ON OLF |
| REGISTER A | φ1 ON OLG | φ2 ON OLG | φ3 ON OLG | φ4 ON OLG | φ5 ON OLG | φ6 ON OLG | φ7 ON OLG | φ8 ON OLG |
| REGISTER B | φ1 ON OLH | φ2 ON OLH | φ3 ON OLH | φ4 ON OLH | φ5 ON OLH | φ6 ON OLH | φ7 ON OLH | φ8 ON OLH |
| REGISTER C | R1 S BEFORE | R2 P BEFORE | R2 S BEFORE | R2 P BEFORE | 2" GRN BEF | 4" GRN BEF | 8" GRN BEF | 16" GRN BEF |
| REGISTER D | φ1 PREEMPT | φ2 PREEMPT | φ3 PREEMPT | φ4 PREEMPT | φ5 PREEMPT | φ6 PREEMPT | φ7 PREEMPT | φ8 PREEMPT |
| REGISTER E | SPARE | SPARE | MASTER | ½" RED REST | 1" RED REST | 2" RED REST | 4" RED REST | 8" RED REST |
| REGISTER F | R1 RED REST | R2 RED REST | R1 CHANGE | R2 CHANGE | R1 FORCE OFF | R2 FORCE OFF | PREEMPT REQ | SINGLE RING |

What I claim is:

1. A traffic signal interconnect system in which a plurality of local controller means provide control of normal signal display cycles and include coordination means to provide signal cycle program and maintain cycle time reference with other similar local controller means, said coordination means comprised of:

A. standard broadcast time receiving means,

B. internal time means to record and advance the time of year independently from said broadcast time receiving means, C. broadcast time data check means to assure validity of data from said broadcast time receiving means, D. time correction means to update data of said internal time means with data of said broadcast time receiver means after input of said broadcast time data check means, E. programmable cycle means to input data for a plurality of cycle lengths, F. a plurality of cycle input means to externally select a cycle length from data of said programmable cycle means, G. cycle counter means to record and advance time of cycle independently from said internal time means with cycle duration based on data of said cycle input means, H. cycle correction means to relate data of said cycle counter means to data of said internal time means, I. programmable offset means to input data for a plurality of offsets, J. a plurality of offset input means to externally select an offset from data of said programmable offset means and advance data of said cycle counter means by data of said programmable offset means.

2. The system of claim 1 including time program means to provide changes in signal cycle program that accommodates anticipated changes in traffic patterns, said time program means comprising:

A. a plurality of time function means to indicate certain times of the day,

B. a plurality of time cycle means to select alternate cycle lengths,

C. a plurality of time offset means to select alternate offsets,

D. a plurality of time split means to select alternate splits, and

E. a means to connect said time function means, said time cycle means, said time offset means, and said time split means, to adjust signal cycle timing according to a time of day schedule.

3. The system of claim 2 wherein said time function means to indicate certain times of the day comprises:

A. programmable time range means to input time-of-day range data preset parameters, B. means for comparison of said time range means data with data of said internal time means, and C. means for time function output that is activated when data of said internal time means lies within said time range means data.

4. The system of claim 2 wherein said time cycle means to select alternate cycle lengths comprises a means to jumper program said time function means to said cycle input means.

5. The system of claim 2 wherein said time offset means to select alternate offsets comprises:

a means to jumper program said time function means to said offset input means.

6. The system of claim 2 wherein said time split means to select alternate signal cycle split comprises:

A. split input means for selecting alternate signal phase timing allocation plans within a signal cycle, and B. means to jumper program said time function means to said split input means.

7. The system of claim 1 including traffic program means to provide changes in signal cycle program that accommodates detected changes in traffic patterns, said traffic program means comprising:

A. a plurality of traffic function means to determine changes in traffic patterns, B. a plurality of traffic cycle means to select alternate cycle lengths, C. a plurality of traffic offset means to select alternate offsets, D. a plurality of traffic split means to select alternate splits, and E. a means to connect said traffic function means, said traffic cycle means, said traffic offset means, and said traffic split means to adjust signal cycle timing according to a traffic responsive schedule.

8. The system of claim 7 wherein said traffic function means to determine changes in traffic patterns comprises:

A. trafic detector means for detecting and counting traffic on a plurality of signal approaches, B. programmable traffic range means to input traffic range data preset parameters, C. means for comparison of said traffic range means data with data of said traffic detector means, and D. means for traffic function output that is activated when data of said traffic detector means lies within data of said traffic range means.

9. The system of claim 7 wherein said traffic cycle means to select alternate cycle lengths comprises a means to jumper program said traffic function means to said cycle input means.

10. The system of claim 7 wherein said traffic offset means to select alternate offsets comprises a means to jumper program said traffic function means to said offset input means.

11. The system of claim 7 wherein said traffic split means to select alternate signal cycle split comprises:

A. split input means for selecting alternate signal phase timing allocation plans within a signal cycle, and B. input means to jumper program said traffic split means to said split input means.

12. The system of claim 1 including actuated controller unit means of said local controller means comprising:

A. master module means for coordination and normal phase sequencing,

B. a plurality of phase module means for interval sequencing, interval timing, and signal display control outputs with standard traffic responsive phase scheduling and green display duration timing adjustment to demand, C. preemptor module means for generating overlap signal display control outputs and preemptor phase sequencing, and D. a means to interconnect said master module means, said phase module means and said preemptor module means to provide coordination of signal cycle along with normal and preemption phase sequencing, interval sequencing, interval timing, and signal display control outputs with cycle length, offset, and green duration timing adjustment in response to traffic demand.

13. The system of claim 12 wherein said master module means for coordination and normal phase sequencing comprises:

A. a plurality of phase request input means with standard traffic responsive phase scheduling to indicate servicable demand for right-of-way by said phase module means, B. a plurality of phase next output means to indicate the next said phase module means to be assigned control when said controller unit means is in clearance intervals, C. a plurality of phase control output means for selecting the said phase module means to be displaying right-of-way indications and allow timing walk, pedestrian clearance, initial portion, extensible portion, and maximum green intervals by said phase module means, D. a plurality of ring check input means to indicate request to terminate activation of said phase control output means and inhibit activation of said phase control output means for the next phase of the sequence, E. preemptor active input means to terminate and inhibit activation of said phase control output means and said phase next output means to allow for external preemptor phase sequencing, F. pretimed select input means to change data output of said phase next output means to indicate data of said cycle counter means and provide coordinated percent of cycle output data, G. real time computer master means to provide said coordination means including time program means to provide changes in signal cycle program that accommodates anticipated changes in traffic patterns and traffic program means to provide changes in signal cycle program that accommodates detected changes in traffic patterns, and to provide for monitoring said phase request input means, said ring check input means and said preemptor active input means, and to activate said phase next output means and said phase control output means for phase sequencing according to standard phase sequencing program.

14. The system of claim 12 wherein said phase module means for internal sequencing, interval timing, and phase signal display control outputs with standard traffic responsive timing adjustment to demand comprises:

A. controller unit phase input means for standard vehicle call detector, hold, phase omit, inhibit max termination, omit red clearance, stop timing, interval advance, call to non actuated mode I, call to non actuated mode II, and pedestrian call detector inputs, B. phase vehicle signal output means for standard phase vehicle green, yellow, and red load switch outputs, C. pedestrian signal output means for standard phase walk, clearance, and don't walk load switch driver outputs, D. controller unit illuminated indicator means for standard vehicle call, pedestrian call, maximum termination, gap termination and status bits a, b and c displays, E. phase control input means to enable timing and display of standard right-of-way intervals, F. phase request output means to indicate serviceable demand, G. exclusive pedestrian output means to indicate demand for and timing of exclusive pedestrian intervals, H. ring check output means to indicate request for deactivation of phase control input means and to indicate the timing of phase yellow and red clearance intervals, I. parameter basis input means for input of interval duration for walk, pedestrian clearance, yellow and red clearance intervals, J. parameter normal input means for input of interval duration for minimum initial, maximum green extension, alternate maximum green extension, and maximum gap intervals, K. parameter density input means for input of interval duration for maximum initial, added initial per actuation, maximum gap, and time to reduce to minimum gap intervals, L. real time computer phase means to monitor said controller unit phase input means and said phase control input means then activate said phase request output means and to time signal intervals based on data of said parameter basic input means, said parameter normal input means and said parameter density input means, and to advance phase intervals and activate said phase vehicle signal output means and said pedestrian signal output means in accordance with standard phase sequencing program.

15. The system of claim 12 wherein said preemptor module means for generating preemptor phase sequencing and overlap signal display outputs comprises:

A. preemption request input means for scheduling and retaining preemption phase sequencing program, B. parameter preemption input means for input of preemptor phase sequencing schedule data, C. a plurality of phase request input means with standard traffic responsive phase scheduling for indicating servicable demand for right-of-way by said phase module means, D. a plurality of phase control output means for selecting the said phase module means to be displaying right-of-way indications and allow timing walk, pedestrian clearance, initial portion, extensible portion, and maximum green intervals by said phase module means, E. a plurality of phase next output means to indicate the next said phase module means to be assigned control when said controller unit means is in clearance intervals, F. a plurality of ring check input means to indicate request to terminate activation of said phase control output means and inhibit activation of said phase control output means for the next phase of the sequence, G. real time computer preemption means to monitor said phase request input means, said ring check input means and said preemption request input means, and to activate said phase next output means and said phase control output means for phase sequencing according to data of said parameter preemption input means.

H. a plurality of phase control input means to indicate said phase module means that is assigned control, I. a plurality of exclusive pedestrian input means to indicate demand for and timing of exclusive pedestrian intervals, J. parameter overlap input means for input of overlap phase sequencing schedule data, K. a plurality of overlap output means to generate standard overlap vehicle green, yellow, and red load switch outputs, L. real time computer overlap means to monitor said phase request input means, said phase next input means, said phase control input means and said ring check input means, and to activate said overlap output means for overlap signal displays according to data of said overlap phase sequencing schedule means.

16. The system of claim 1 including pretimed control unit means of said local controller means comprising:

A. master module means for coordination of signal cycle including percent of cycle output means to provide coordinated percent of cycle data output when a pretimed mode select input means is activated, B. pretimed program module means for generation of signal display activations to a signal display control output means in response to data of a percent of cycle input means, said pretimed program module means comprising:

1. programmable percent of cycle decoder means to transform data of said percent of cycle input means into interval numbers, 2. a plurality of programmable interval number decoder means to transform data of said cycle decoder means into said activations of said signal display control output means, 3. alternate interval program selection means to select an alternate programm of percent of cycle to interval transformations within said percent of cycle decoder means, 4. alternate signal program selection means to select an alternate program of cycle input data to interval number transformations within said programmable interval number decoder means.

C. a means to connect said master module percent of cycle output means to said pretimed program module percent of cycle input means to generate interval timing, interval sequencing, phase sequencing, and signal display control output activations in response to a time of cycle signal program.

* * * * *